United States Patent
Mee et al.

(10) Patent No.: US 12,284,171 B2
(45) Date of Patent: Apr. 22, 2025

(54) COMPUTER-IMPLEMENTED SYSTEM AND METHOD

(71) Applicant: nChain Licensing AG, Zug (CH)

(72) Inventors: Andrew James Mee, London (GB); Steven Patrick Coughlan, London (GB)

(73) Assignee: nChain Licensing AG, Zug (CH)

(*) Notice: Subject to any disclaimer, the term of this patent is extended or adjusted under 35 U.S.C. 154(b) by 484 days.

(21) Appl. No.: 17/612,544

(22) PCT Filed: May 21, 2020

(86) PCT No.: PCT/IB2020/054837
§ 371 (c)(1),
(2) Date: Nov. 18, 2021

(87) PCT Pub. No.: WO2020/234824
PCT Pub. Date: Nov. 26, 2020

(65) Prior Publication Data
US 2022/0303258 A1     Sep. 22, 2022

(30) Foreign Application Priority Data

May 21, 2019  (GB) ..................................... 1907180
Feb. 19, 2020  (GB) ..................................... 2002285

(51) Int. Cl.
H04L 9/40     (2022.01)
(52) U.S. Cl.
CPC ................................ H04L 63/083 (2013.01)
(58) Field of Classification Search
None
See application file for complete search history.

(56) References Cited

U.S. PATENT DOCUMENTS

2002/0116485 A1*  8/2002  Black .................... H04L 41/344
                                                           709/227
2002/0124108 A1*  9/2002  Terrell ................... H04L 63/10
                                                           709/230
(Continued)

FOREIGN PATENT DOCUMENTS

CA       2959854 A1     9/2017
EP       2974210 A1     1/2016
(Continued)

OTHER PUBLICATIONS

UKIPO Search Report for Application No. GB2007597.4, dated Feb. 10, 2021.
(Continued)

*Primary Examiner* — Kaveh Abrishamkar
(74) *Attorney, Agent, or Firm* — Messner Reeves LLP

(57) ABSTRACT

In a first aspect, the present disclosure proposes computer implemented methods, devices, and systems for implementing a channel service for messages or transactions that are associated with a blockchain, the channel service being provided for one or more clients. The method comprising providing a given client access to one or more functions that enable direct communication between the given client and another entity, the one or more functions include (i) channel functions or procedures pertaining to one or more channels for transmission of data; and/or (ii) message functions or procedures pertaining to the data being transmitted using the one or more channels. In a second aspect, the present disclosure proposes computer implemented methods, devices, and systems for implementing addressing for a channel service, such as the channel service in the first aspect. Communication using a channel associated with the channel service is initiated based on the addressing keys pertaining to the communicating entities.

19 Claims, 12 Drawing Sheets

(56) References Cited

U.S. PATENT DOCUMENTS

| | | | |
|---|---|---|---|
| 2014/0007198 A1* | 1/2014 | Durbha | H04L 63/102 726/4 |
| 2014/0304835 A1 | 10/2014 | Odnovorov et al. | |
| 2015/0269539 A1 | 9/2015 | MacGregor et al. | |
| 2016/0364721 A1 | 12/2016 | Deliwala et al. | |
| 2017/0352027 A1 | 12/2017 | Zhang et al. | |
| 2019/0104196 A1 | 4/2019 | Li et al. | |
| 2019/0139037 A1* | 5/2019 | Khalil | H04L 9/3247 |
| 2019/0251297 A1* | 8/2019 | Khan | G06F 21/335 |
| 2019/0333059 A1 | 10/2019 | Fallah et al. | |
| 2020/0068028 A1* | 2/2020 | Gurtin | H04L 51/08 |

FOREIGN PATENT DOCUMENTS

| | | |
|---|---|---|
| JP | 2013524632 A | 6/2013 |
| KR | 101628007 B1 | 6/2016 |
| KR | 101795695 B1 | 12/2017 |
| KR | 101932277 B1 | 12/2018 |
| KR | 20190001243 A | 1/2019 |
| WO | 2011119793 A2 | 9/2011 |
| WO | 2014159905 A1 | 10/2014 |
| WO | 2019092508 A2 | 5/2019 |

OTHER PUBLICATIONS

International Search Report for PCT/IB2020/054837, dated Jun. 24, 2020.

Sam Dutton, Getting Started with WebRTC, Jul. 23, 2012, pp. 19, 20, 27, 28, http://www.html5rocks.com/en/tutorials/webrtc/basics/.

Michael Zima, Sending Money Like Sending E-mails: Cryptoaddresses, The Universal Decentralized Identities, Dec. 15, 2016, the whole document, Cornell University Library, Ithaca, NY.

ITO Direct Yazan Naoya ITO, "Emerging Web Technology Laboratory," WEB+DB PRESS, Dec. 23, 2014, vol. 79, pp. 112-121.

* cited by examiner

COMPUTER-IMPLEMENTED SYSTEM AND METHOD

CROSS REFERENCE TO RELATED APPLICATIONS

This application is a U.S. National Stage of PCT Application No. PCT/IB2020/054837 filed on May 21, 2020 which claims the benefit of United Kingdom Application No. 1907180.2, filed on May 21, 2019, and United Kingdom Application No. 2002285.1, filed on Feb. 19, 2020, the entire contents of which are incorporated herein by reference.

TECHNICAL FIELD

This disclosure relates generally to methods and systems for implementing a channel service using one or more channels for communication between entities. Particularly, the present disclosure relates, but is not limited to, the provision of access to one or more functions or applications via or using channels for entities that enable or facilitate or allow peer-to-peer or direct communication between such entities for transactions or messages.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software license, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licenses, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples, applications and/or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and download BSV libraries in order to be able to transfer an asset or control of an asset to another entity or peer. Thus, not only do clients need to include processing to implement such functionality, but they also need to ensure that appropriate security measures are implemented for such processes.

Simplified payment verification (SPV) mechanisms exist, where applications require information from the blockchain but do not have direct links to it, as they do not run a full miner node. Such SPV applications allows a lightweight client to verify that a transaction is indeed included in a blockchain, without downloading the entire blockchain. Although this is advantageous, this still presents a requirement for a client to run parts of the blockchain that are associated with transactions pertaining to it, as either the sender or the recipient among the peers is required to ultimately submit the transaction to the blockchain, and identify if said transaction has been mined.

Accordingly, there is a desire to implement secure, low-complexity, user-friendly, efficient, and robust techniques that will allow any client, whether computationally sophisticated or not, to be able to instantaneously access and interact with another party, i.e. a counterparty or a sender/recipient of a transaction associated with said client, directly (in a peer-to peer manner) in a simple, orderly, fast, accurate, reliable, and secure manner, that is computationally and functionally less onerous for the client. More particularly, there is a desire to make use of distributed ledger (blockchain) technology, and the advantages of increased security, transparency, and reliability of records in a manner that enables any client computing device to ensure that any data, event, or digital asset associated with the client, can be instantaneously and securely mined, or written into the blockchain easily—thereby providing a lasting, tamper-proof, and auditable record of it, which can be created, written, updated, read, or viewed as required; while not downloading or running any part of the blockchain.

Such an improved solution has now been devised. The present disclosure addresses the above technical concerns by proposing one or more techniques that enables direct or peer-to-peer communication for clients, by methods, devices, and systems which provide an interface or functions for a channel or a messaging service, without such clients needing to implement any processing or functionality for the blockchain, while still being able to avail all advantages associated with it. Data, or information associated with a client may be simply, securely, and instantaneously either written into or obtained from the blockchain, while disassociating the client from the blockchain.

SUMMARY

In a first aspect, the present disclosure proposes computer implemented methods, devices, and systems for implementing a channel service for messages or transactions between entities, the channel service being provided for one or more clients. The method comprising providing a given client access to one or more functions that enable direct communication between the given client and another entity, the one or more functions include (i) channel functions or procedures pertaining to one or more channels for transmission of data; and/or (ii) message functions or procedures pertaining to the data being transmitted using the one or more channels.

In a second aspect, the present disclosure proposes computer implemented methods, devices, and systems for implementing addressing for a channel service, said channel service provided for messages or transactions between entities, the channel service being provided for one or more clients. The method comprising providing at least one service/client/miner endpoint from one entity, and an associated addressing key. An addressing key associated with another entity for communication is obtained. Access is provided to one or more functions that enable direct communication between the entities using a channel for the transmission of data or messages, wherein communication using the channel is initiated based on the addressing keys.

Throughout this specification the word "comprise", or variations such as "includes", "comprises", or "comprising", will be understood to imply the inclusion of a stated element, integer, step, or group of elements, integers, or steps, but not the exclusion of any other element, integer, step, or group of elements, integers, or steps.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1:
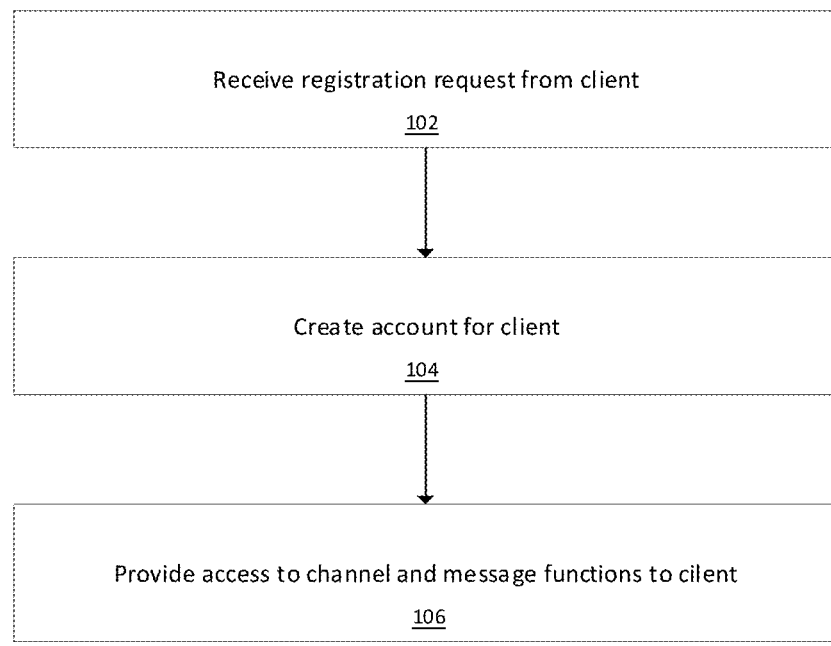
FIG. 1 is a flowchart, depicting a method for providing a channel service for one or more clients according to a first aspect, as implemented by one or more channel processors associated with the channel service.

With a scaling of the use of distributed ledger (blockchain) technology for a number of applications requiring a secure, reliable, auditable, tamper proof and reliable record of events or transactions associated with it, solutions for participating entities have traditionally relied on synchronising a full copy of the blockchain in real-time, identifying both transactions and embedded data pertinent to their applications directly from the blockchain. However, as the scope, capability, and security of applications evolves, and as the blockchain scales, it has become clear that there is a need for a technical solution that allows parties to communicate directly, and for such applications to exchange messages directly, in order to scale and fully realise and utilise the full potential of the advantages associated with the blockchain, and making such a solution available to any type of client—whether computationally sophisticated or not.

In accordance with a first aspect, the present disclosure provides a computer implemented method for implementing a channel service or functionality for messages or transactions between entities, the channel service being provided for one or more clients. In a first implementation of the first aspect, the method implemented by a channel processor. In some embodiments, the channel service refers to one or more functions or procedures or application programming interfaces (APIs) that will herein be described henceforth. In some embodiments, the channel processor may be one or more computing devices, or servers, or cloud based software solutions that may be running on single, remote or distributed computing nodes or entities that can be accessed by one or more clients over a wired or wireless communication network. In some embodiments the client may be an entity, user terminal/device or a computing device or system having one or more processors. In some embodiments, the client may be associated with a digital wallet that allows the client to manage one or more digital assets such as cryptocurrency and tokens etc. In some embodiments, the channel service may be provided to a given client among the one or more clients via a digital wallet. However, it is to be understood that client entities not having a digital wallet or a separate applications for digital assets are also within the scope of this disclosure. In some embodiments, especially for computationally sophisticated clients, the channel processor implementing the channel service can be integrated with or be part of the client entity. In this case, the channel processor may be implemented as a module within a client terminal that enables channel service functionality for said client. In some embodiments, other clients or entities may also be served by said channel processor.

The method according to the first aspect includes receiving a request from a given client among the one or more clients, the request pertaining to the channel service. In some embodiments, this request can be sent over a network such as Internet. In some embodiments, the client can thus communicate with the channel service via known Internet communication protocols. In some embodiments, this requests relates to a request for registration of a given client with the channel service provider or processor. The method then includes creating an account for the given client, said account having an account identifier specific to the given client, and an access key specific to the account identifier. This account identified may be provided by the channel service or by the client. Together, these make up the credentials for a given client's accounts, akin to a client ID and PIN or password pair. In other embodiments, these credentials may also be based on an asymmetric cryptographic key pair including a private and public key associated with the given client.

Once registered, the method includes providing the given client access to one or more functions that enable direct communication between the given client and another entity, wherein said one or more functions include: channel functions or procedures pertaining to one or more channels for transmission of data; and/or message functions or procedures pertaining to the data being transmitted using the one or more channels. In some embodiments, the one or more channels enable direct or peer-to peer communication paths or sessions between entities for the transfer of messages or data. In most embodiments there are only two entities for each channel. However, there may also be some limited situations where a third entity may also be provided with access to the same channel.

In this first implementation, as the one or more functions are in the form of interfaces or access points are provided for the client, one entity for the channel will be the client, the other being another device or entity or user terminal with the client wishes to communicate with directly. In most embodiments, the channels enable full-duplex, i.e. two-way communication between the client and the other entity. In some embodiments, communication may only be allowed in one direction, i.e. the client might only want to send messages to or receive messages form the other entity.

Advantageously, with the first aspect no BSV, Bitcoin, blockchain knowledge, ECDSA, or other cryptographic key-management libraries specific to a blockchain, or transaction construction software etc., needs to be implemented by the client for peer to peer transactions. The client using one or more processing resources or user terminals simply registers to use the channel service via known authentication techniques, such as password protection authorisation or standard public key infrastructure (PKI) for verifying client identify for the purposes of account registration. Once the one or more functions from the channel service have been received, the client will simply be able to communicate with the other entity using standard communication/transport protocols, i.e. Internet protocols such as Hyper Text Transfer Protocol (HTTP)/Transmissions Control Protocol (TCP) or similar. For client entities that are associated with a business or may represent an organisation, such as a such as merchant, such clients may have a large a number of other entities (customers) conducting transactions with them regarding a number of goods. Therefore, for such scenarios, using channels for communication with one or more customers, while being disassociated or decoupled from implementing any functionality that is related to the blockchain that maintains a record of all such transactions will be hugely beneficial. With the provision of channel functions as well as message functions, such clients have the ability to utilise a specific channel for a specific customer relating to a specific transaction (such as a particular invoice or a query for certain goods etc).

In some embodiments, a given channel is associated with a specific channel identifier. The same client can have a number of separate channels, each with its own unique identifier. In some embodiments, the given channel is for communication with another entity in relation to data that is associated with a specific type or topic, where the data associated each topic in a channel is or is included in one or more messages or transactions. Advantageously, having a specific channel for a specific topic ensures greater clarity, reliability and flexibility for the client, especially in case of a client like a merchant entity, which may have a number of topics (such as a transaction number or invoice) that needs to be tracked or dealt with separately.

Also advantageously, the use of channels allows an asynchronous processing of each request or message that is in a given channel. This allows seamless and accurate discontinuous or delayed processing flow for messages in a channel, since there is always clarity of the order as well as the messages, as the channel is specific to a given topic. This can be particularly useful for implementations or situations where a response from the other entity (or the client), is required to proceed further with a transaction, but where the client or other entity may not be operational or online or able to provide such response immediately. Thus, the above technique enables request to still be delivered reliably and processed accurately and in order using the channel, even when the a party to the channel is offline or unresponsive, as the messages will still be present in the channel for when they are next online or connected to a network so they can access the messages in the channel. Furthermore, no matter how many other messages may have been provided in the channel, they will be accessible to the other entity in the order of delivery. Thus, in spite of a delay or interruption in processing the request, the processing of messages in the channel is completed accurately and seamlessly as if there was no delay at all. In some embodiments, there may be one or more rules associated with a specific channel associated with a specific topic for when a party is offline or online, for instance (i) messages are to be responded to in order of arrival, so ensure no gaps in transmission or (ii) a channel cannot be completed unless all messages are responded too, etc. to preserve data integrity.

In some embodiments, the client is the owner of the one or more channels, these being the channels that are based on the one or more functions provided by the channel service. In some embodiments, the one or more functions are application programming interfaces (APIs) issued for or provided to the given client, said APIs including channel API's for the one or more channels; and message APIs for data, i.e. messages relating to a topic associated with each, or a given channel. APIs may be understood as endpoints, interfaces or a set of functions and procedures allowing the creation or management of applications for an entity, such as the client in this case, that access the features or data of an application, or other services. In this case, it is to implement the channel functions as well as message functions.

In some embodiments, the method further comprises the step of issuing one or more access tokens for a given channel among the one or more channels for a client, said token(s) being configured for secure communication with another entity. The one or more access tokens pertaining to the given channel or even for one or more messages in the given channel. In some embodiments, the access tokens are API tokens that are specific to a given channel or a given message. Access tokens, and specifically API tokens may in some embodiments act as unique identifiers for an entity or application requesting access to a service or a channel. In some embodiments, access token may be considered to be unique authentication credentials assigned to individual client accounts, and can even be as granular as for individual channels or individual messages in each channel. In some embodiments, the access tokens may be such that the client can provide these tokens to the other entity for each of its channels for authentication. In the present embodiments, the access tokens may be generated or provided by the client or the channel service for one or more other entities, each having a different channel.

In some embodiments, the channel processor is associated with a HTTP API endpoint, and wherein the request from the given client is received based on a HTTP transmission protocol format, such as HTTP, HTTP Secure (HTTPS) etc. In some embodiments of the first aspect, the received request from the client is an HTTP GET or HTTP POST or HTTP PUT or HTTP PATCH request that includes or is associated with a client identifier, specific to a given client, as well as a channel identifier for a specific channel for the client, if one exists for the client.

Advantageously, the channel processor API allows for a web-based interaction interface, i.e. it may in some embodiments be implemented as a web service for the one or more clients, such that communication may take place over the Internet using standard Internet communication protocols for web-based services. For instance, in some embodiments, HTTP messages or requests in an application level between peers, or layer between a client and the channel service may be transmitted and received based on any standard Internet based transport layer protocols. The reference to HTTP transmission protocols, or HTTP API, herein also encapsulates all standard Internet communication protocols, such as TCP/IP, UDP, HTTPS, etc. In some embodiments the channel processor is implemented as a Representational State Transfer (REST) endpoint.

In the embodiments, where there may be more than one channel processor for providing the channel services for one or more clients, i.e. there may be distributed channel processors or webservers associated with the same channel service, the method of the first aspect further comprises the step of providing an application programming interface (API) converter, for performing the steps of: receiving the request from the client in the HTTP transmission protocol format, converting a received request to a Remote Procedure Call (RPC) format, and sending the RPC request to a given processor among the plurality of processors, that is configured to implement the received request. In a reverse flow path this embodiment includes receiving a response associated from a given channel processor in an RPC format, and converting the respective response to be sent to the client using the HTTP, or a similar transmission protocol.

This is advantageous as it allows the client to communicate requests that are associated with the blockchain via simple HTTP based protocols, using a web-based platform API, and seamlessly providing interoperability with any of the nodes or servers that implement the above described services, but that do not communicate using Internet protocol communication standards for web services. The API convertor implemented in this embodiment is not limited to HTTPS to RPC and vice versa conversion. In the reverse flow path, the method of the first aspect also includes receiving responses a from a respective processor in an RPC format, and accordingly, converting the respective responses using HTTP for sending on to the client. Thus, advantageously implementing the proposed interface by the channel processor enables seamless communication the client and the channel processor use different wireless data communication protocols and mechanisms.

In some embodiments, the account identifier assigned or provided for a client is an alias that is provided for a given client. Advantageously, to make client identification as well as addressing simpler, there already exist mechanisms where a memorable and more user-friendly alias is used instead of complicated public address for one or more client entities. Such a solution is proposed in U.S. patent application Ser. No. 16/384,696 in the name of nChain Holdings Limited. These documents set out an alias-based payment service and associated protocols, referred to as bsvalias payment service, where an alias is used for destination addressing instead of the public address of a client entity. The alias in such a system is usually associated with a domain name of a sending/receiving client entity and may be a URI or an email address. Thus, as long as a sender or entity is aware of, or is provided with the alias, this is sufficient for the bsvalias payment system or another alias based addressing mechanism. Messages may be sent to the alias of a client, for instance, using instructions provided in a machine-readable resource, such as a JavaScript Object Notation (JSON) document, saved in a well-known URI or location for the bsvalias or other payment service. In some embodiments of the present disclosure, one or more of the plurality of clients may have an alias such as the above to identify the respective other entities for peer to per transactions, whether they are associated with links to the blockchain or not.

In some embodiments of the first aspect, once a client has been registered with the channel service and has been provided with account credentials and one or more functions or API associated with the channel service, the channel processor may also to provide one or more functions or APIs specific to a channel. In this case the method includes receiving a request from the given client, the request associated with a channel for the client account. The request may include for example access or functionality associated with one or more of:

- a request for listing the one or more channels pertaining to the account for the given client;
- a request for creating a channel for the account;
- a request for deleting an identified channel;
- a request for amending the properties and/or permissions associated with an identified channel;
- a request for generate a channel access token for an identified channel;
- a request revoke a channel access token for an identified channel.

In the above embodiments, the method of the first aspect comprises validating the client based on the client account identifier, which may be based on a record corresponding to the client account identifier and access key saved or assigned during account registration. Such a record may be associated with the channel processor. Then, based on a successful validation of the client, the method includes either additionally or optionally, the step of determining if the received request from the client is valid based on the channel identifier. This is, for instance, to check if that channel is active based on a channel API provided for the client, or based on one or more settings or permissions included in the respective record. In some embodiments, an attribute or setting may indicate whether or not a given client is allowed access to all or part of the requested service for the channel. For instance, one or more levels of permission associated with the client identifier may be provided in the attribute or setting. For example, a given client may be allowed to request services to create channels, send/receive messages on a channel, but may not be allowed to modify, delete or terminate a message in a channel; whereas another client may have permission for all of the above actions pertaining to one or more services for a channel. In another example, the request to create another channel for an already existing topic, such as an existing invoice number may be rejected, which advantageously could prevent fraudulent messages or channels being created by impersonators or malign parties.

In some embodiments, there may also be further checks to check the integrity of the data or messages in a channel, such as based on checksums or hash values that may be stored further to each or a set number of message being sent or received in a channel. This ensures that a malign party does not gain access and tamper with the data in a message or channel.

In some embodiments, the step of verifying the identity of a given client may be based on a digital signature associated with the client. Cryptographic key pairs, including a private key and a public key (or public address) associated with each client, may be used for verifying that a request made for a service did indeed originate from the given client, i.e. where data signed by a private key can only be recovered or validated using the corresponding public key. Standard public key infrastructure (PKI) techniques may be used and implemented if verification is based on a digital signature.

Then, based on a determination that the account identifier and access key pertaining to the given client are valid; and based on a determination that the request is valid, the method includes processing the request for the channel; and includes sending a response to the given client, the response including access to one or more channel functions relating to the request.

Similar to the above channel functions related to channels for a client account, one or more message functions or message API may also be provided to the client using a similar process upon receipt of a request associated with one or messages in a given channel by the client. These may include providing one or more APIs for the following requests associated with a message:
- a request for testing for new messages in the given channel;
- a request for retrieving a message in the given channel;
- a request marking or identifying read or unread messages in the given channel;
- a request for writing a message in the given channel.

In the case of message APIs in the response provided, this is provided to the client for controlling or managing the transfer, rules, permissions for either a particular message or each message in a channel. Such APIs may in some embodiments be provided so that the client can share this with a counterparty for the channel, i.e. the other entity.

In some embodiments, the channel or message function(s) provided in the response include(s) a JavaScript Object Notation (JSON)-over-Hyper Text transfer protocol (HTTP) API for the account, to enable access, creation and/or management of one or more messages by the client or the other entity.

Advantageously, the provision of access to functions such as APIs or tokens that are specific to a given channel for a client, or to one or more messages within a given channel ensure that control as well as management of the channels and messages rests with the client, when conducting direct or peer to peer communications with another entity. In some embodiments, once APIs or functions are provided for a channel, said control may not need to be requested for another message, but may need to be requested for a different channel. Also, this ensures limitations on a particular channel or message may be policed. For instance, if multiple payment reminders in the form or messages or reminders are sent but are being ignored by the other entity, the requests associated with further channels for said other entity or requests to delete or mark said messages as unread may be rejected.

In some embodiments, a channel service library including one or more modules for facilitating the channel function(s) and/or the message function(s) received from the channel processor for the account associated with the given client may be provided by the channel processor for the client.

In a second implementation of the first aspect of the present disclosure, a computer implemented method for accessing a channel service for messages or transactions is provided, the method implemented by one or more processors of a given client among the one or more clients. The second implementation is similar to the first implementation, and is associated with similar advantages. It is to be noted that in some embodiments, clients for the channel service may also be one or more miner nodes, or entities that are associated with the blockchain or run a full node. Although the present method is particularly advantageous for a client that wishes to communicate directly with another entity so not have any links associated with a blockchain, this does not preclude miner nodes or clients associated with other full or partial (SPV) wallet implementations to also make use of such channel service for peer to peer communications. For instance, an important and useful application could be for such miner modes to use the channel to send proof of mining or inclusion proofs directly to another party, which may be a channel processor, or another entity associated with the blockchain transaction. In this embodiment, when a transaction is submitted (this can be done by either a client or the channel service) to be mined by a miner, the miner, based on channel functions received from the channel processor or the client, can submit proof of inclusion back to the submitter of the transaction using the channel. Advantageously, by this neither the client nor the channel processor (or any submitting party) needs to check to run any part of the blockchain to verify the transaction submission, since such proof is now directly delivered to the submitter via the channel. This is advantageous, as it aids scalability and optimisation of resources for peer to peer applications that are to be written into a blockchain, since there is no longer a need for any entity to check of the blockchain to access for their transactions.

The method comprises the steps of sending a request pertaining to the channel service, the channel service implemented by a channel processor, and in reply obtaining account credentials for an account created for the given client, said account credentials including an account identifier, and an access key specific to the account identifier. Then the client implemented method includes obtaining access to one or more functions that enable direct communication between the given client and another entity. As with the first implementation, said one or more functions include: channel functions or procedures pertaining to one or more channels for transmission of data; and/or message functions or procedures pertaining to the data being transmitted using the one or more channels.

In some embodiments, the method as implemented by the client also includes sending a request pertaining to a channel or a message for the given client's account, so that specific API's can be delivered to the client, as discussed above. The channel API received by the client in the channel processor's response is for advantageously enabling creation and/or management of one or more channels. The received response includes in some embodiments access tokens, such as channel API tokens for each channel function as mentioned above. In the case of message functions, the message APIs issued by the channel processor for the client account advantageously enables the given client and one or more other entities to exchange messages, and/or read data from, and/or write data to the given channel. The received response includes in some embodiments access tokens, such as message API tokens for each message function.

In some embodiment of the first aspect, in order for the client the interact with a counterparty or another entity using a channel service and the one or more channels, as well as message functions or API that are obtained from the channel processor, the method includes the step of identifying another entity with which to conduct a communication exchange. This may be by using either an access point or alias known for the other entity or provided by another entity. Then, using one or more channel functions received from the channel processor, creating a channel for communication, and sending one or more access tokens associated with the channel to the other entity. This advantageously enables the secure, reliable and accurate set up of a channel with the other entity, which may be a customer of a merchant client. The method then includes, using one or more message functions for the channel received form the channel processor, writing at least one message pertaining to a transaction to the channel, and sending one or more access tokens associated with the one or more messages to the other entity. This advantageously ensures that authentication of any response can take place via the access tokens. The method includes receiving at least one reply message pertaining to the transaction in the channel.

Responsive to completion of the communication exchange, which may be indicated once confirmation of a payment of a digital asset is received, i.e. similar a remittance note by the other entity or a confirmation of funds received by the client, then such completed transaction associated with the channel is prepared for submission to the blockchain. In some embodiments, this is sent to the channel processor which then can submit the transaction on behalf of the client. By this, advantageously neither party in the peer-to peer transaction (the client or other entity) is responsible for submitting the completed transaction to the blockchain. This may be done by the channel processor, and then mined by one or more miner nodes associated with a blockchain. Therefore the client does not require to run any functionality that is associated with a blockchain, not even an SPV wallet or any other form of digital wallet. In some embodiments, if the client or indeed the other entity has the functional to be able to submit a transaction, then the submission can be done by said client or other entity.

In a third implementation of a first aspect, the present disclosure provides a computer implemented method for processing transactions associated with a blockchain, the method implemented by one or more processors associated with a miner among a plurality of miners, the plurality of miners being communicatively coupled to at least one channel processor implementing a channel service for at least one client. As mentioned above, miner nodes may also access the channel service for facilitating peer to peer communications with one or more other entities. This can be the case whether they are a client of the channel service or not, as long as they receive channel or message APIs and/or assess token associated with a channel from another entity requiring direct communication with the miner. This can be particularly advantageous for a number of blockchain associated applications, as the miner can then use a channel to send a Merkle tree proof of inclusion for a transaction submitted to the blockchain directly to another entity. This is useful as it means that there is no longer any need for either a client such as a merchant or another entity, such as a customer or indeed a channel service to have to search a blockchain to find such transaction. This is because, advantageously, once mined, the proof of inclusion can be directly sent using the channel to either the channel processor or indeed the client or other entity, i.e. whichever entity submits the blockchain transaction for mining.

Of course, mining can also take place using the channel service without the miner of a given transactions being a client registered with the channel service. In this case, the channel processor or indeed the that submits the transaction may simply create using the channel service a channel for the miner inclusion proofs to be received, based on the channel and message functions already provided to it. The miner then becomes the other entity in such channel (then client or channel API being the first entity) and can simply receive the message APIs and access tokens needed via the channel.

A second aspect of the present disclosure related to provision of secure addressing and encryption for channels that are used for peer to peer communication. The aspects and embodiments associated with the second aspect can be implemented separately for one or more peer to peer channel implemented between entities. In can also be used in combination with the embodiments and implementations discussed above, i.e. for the channel service of the first aspect. The below embodiments of the second aspect are discussed in relation the channel service as mentioned in the first aspect, though it is understood to be not so limited.

In a first implementation of the second aspect, the present disclosure provides a method for implementing addressing for a channel service, said channel service provided for messages or transactions, the channel service being provided for one or more clients. The method is implemented by a channel processor and comprises the steps of, receiving a request from a given client among the plurality of clients, the request pertaining to the channel service. Then, a determination of the validity of an account identifier and an access key pertaining to the given client is checked. This check may be performed, as discussed above in related to the first aspect based on stored credentials or indeed based on PKI techniques. The method includes providing a service endpoint for the client. In some embodiments, this may be a service API or a HTTP endpoint for the channel service. The method includes providing at least one service addressing key associated with the channel service, and obtaining at least one client addressing key associated with the client. The addressing keys may be static or ephemeral keys or both, and may be used for verifying the identity of the respective endpoint. Then based on the received request, the method includes providing the given client access to one or more functions that enable direct communication between the given client and another a channel, i.e. a set communication path or session or data tunnel, for the transmission of data or messages, wherein communication using the channel may be initiated based on the service and/or client addressing keys.

As discussed in relation to the first aspect, miner nodes can also utilise the channel service as clients, and in this case in the second aspect, the above method applies in the same way for a miner that is also a client. For ease of reference, endpoints and keys associated with a miner will be referred to as a miner addressing key and a miner endpoints, as the second aspect may request both, client as will as miner (if the client does not have any links with a blockchain) when it comes to mining a completed transaction.

Advantageously, the method of the second aspect of the present disclosure, by implementing a channel service and providing an endpoint, such as an API endpoint as well as addressing keys, such as static and/or dynamic/ephemeral keys, allows one or more processors associated with a client to sign-up and access the channel service like a web service, without any requirement to write or access data into a blockchain. The keys further enable an authentication or handshake procedure to be initiated prior to any transfer of messages via a channel, thereby increasing security by verifying the identity of the parties for which the channel is created for, ensuring that all communication via the channel only takes place between the two authenticated entities.

In some embodiments, the handshake procedure includes obtaining a handshake result or pattern. Based on the handshake result or pattern, obtaining a shared secret key so that direct communication using the channel is encrypted based on a shared secret key. This is further advantageous, as the shared secret key is based on the identity, i.e. the addressing keys of the two parties or entities for which a channel is initiated. Thus, only the respective valid and authenticated parties will be able to decode encrypted ciphertext, thereby increasing reliability as well as privacy, and being resistant to impersonation attempts by malign parties. In this case the parties will be the channel service and another party, i.e. a client, for which communication between the client and the channel processor is via the channel.

A second implementation of the second aspect relates to a method for implementing addressing for a channel using a channel service for messages or transactions, the channel service being provided for one or more clients, where the method implemented by one or more processors of a given client among the one or more clients. As mentioned above, a miner node may also be a client, for making use of the channel service for facilitating peer to peer communications with other nodes. The method incudes sending a request pertaining to the channel service, the channel service implemented by a channel processor, and obtaining a service endpoint associated with the channel service. The method includes obtaining at least one service addressing key associated with the channel service, and providing at least one client addressing key associated with the given client. In the case of the miner this may be the miner addressing key. The method then includes obtaining access to one or more functions that enable direct communication between the given client and another entity using a channel for the transmission of data or messages, wherein communication using the channel is initiated based on the service and/or client/miner addressing keys. Advantageously, this enables the client as well as the service endpoint to securely verify each other's identity. The advantages discussed for the first implementation apply equally.

When a channel is to be established with another entity using the functions provided by the channel processor, the second aspect when implemented by a client includes the method steps of identifying another entity with which to conduct a communication exchange. This may be based on a client identifier or an alias or any other known means, Then, using the one or more functions received from the channel processor, the method includes, creating a channel for the communication exchange. The method then further comprises, using the created channel, performing the following steps:

providing a client endpoint;
obtaining at least one third-party addressing key associated with the other entity;
providing at least one client addressing key associated with the given client;
exchanging one or more handshake messages using the channel based on the client and third-party addressing keys;
based on a handshake result or pattern, obtaining a shared secret key;
wherein said direct communication with the other entity using the channel is encrypted based on the shared secret key.

This advantageously ensures that all communication is now authenticated and secured based on keys associated with the client as well as the other entity. Furthermore, this addressing and authentication aspect, as well as and the provision of end to end encryption is also compatible with the known Noise protocol Framework.

In some embodiments, the endpoints for the service, client and/or miner are HTTP API endpoints, and wherein said endpoint is delivered to the client using a HTTP Secure (HTTPS). This advantageously ensures that the endpoint is verifiable through a chain of certificates leading back to a known and trusted Certificate Authority (CA). In some embodiments, the endpoint(s) may be a Universal Resource Location (URL) included in a response to a request for the one or more functions associated with the channel service. By the above, advantageously the identity of the other party can be known and verified using PKI or other mechanisms by at least one party for the channel.

In some embodiments, the endpoint may be an alias associated with the respective entities of the channel, where the alias being specific to the channel processor and provided by an alias-based addressing service, the addressing service having a machine readable resource that is accessible from a defined or well-known location, the machine readable resource including one or more capabilities pertaining to the channel processor. The alias may either be known or is provided to one or more clients/miners, said alias being associated with an asymmetric cryptographic key pair for authentication.

By the above, advantageously the identity of the both parties can be known and verified using PKI or other mechanisms by both parties.

Aspects of the present disclosure also include a computing device comprising a processor and memory, the memory including executable instructions that, as a result of execution by the processor, causes the device to perform the computer-implemented methods, as discussed above, where the computing device pertains to a channel.

Aspects of the present disclosure also include a computing device comprising a processor and memory, the memory including executable instructions that, as a result of execution by the processor, causes the device to perform the computer-implemented methods, as discussed above, where the computing device pertains to a client.

Aspects of the present disclosure also include a computing device comprising a processor and memory, the memory including executable instructions that, as a result of execution by the processor, causes the device to perform the computer-implemented methods, as discussed above, where the computing device pertains to miner.

Aspects of the present disclosure also include system comprising at least one channel processor communicatively coupled to at least one client and at least one miner via a communication network, the at least one channel processor implementing a channel service for one or more clients, as discussed above.

Aspects of the present disclosure also include a computer-readable storage medium having stored thereon executable instructions that, as a result of being executed by a processor of a computer, cause the computer to perform the method of any of the aspects and embodiments set out above.

Some specific embodiments are now described by way of illustration with reference to the accompanying drawings, in which like reference numerals refer to like features.

The above described aspects and embodiments associated with the present disclosure provide such a solutions and for a secure, off-chain, party-to-party (peer-to-peer/direct) application messaging mechanisms by implementing a channel service for such applications and use cases in a scalable, secure and accurate manner that is easy for entities participating in said direct communication to implement and manage. The aspects and embodiments provides a mechanism via which parties can communicate in a secure manner, even in instances where one of the parties is temporarily offline.

There exist well-known systems and mechanisms for message delivery between entities. These are discussed below briefly:

Electronics Mail (Email):

As one of the oldest and most popular messaging application running on the modern Internet, email provides many positive solutions, including:
  Addressing, clients
  Connectivity (IMAP for push, or Exchange/ActiveSync)
  Synchronisation (IMAP or Exchange/ActiveSync)
  Account Management—based on operator requirements, not client requirements
  Storage
  Security—for authentication (not in relation to in-application)

Some drawbacks meaning that email is not secure of scalable enough for use with applications associated with a blockchain are:

\alternative and more flexible and secure addressing is not present (only email address), more reliable and separate structuring based on topics for counterparties is not present inflexible or limited technical reach as many applications, especially those that are interoperable with a blockchain use machine readable, i.e. JSON-over-HTTP, whereas email is a custom protocol, with many secure private as well as public blockchain networks disallowing the sending of email.

Instant Messengers:

Ubiquitous, secure, scalable, modern instant messenger solutions such as WhatsApp, Telegram, and Signal are useful for some peer-to peer applications. But all of these they are operated by a central authority, that has the power to deny service to anybody, at any time, for any reason. This is incompatible with the very essence of all public blockchains.

Message Brokers:

Message brokers are hardware appliances or software middleware that support a variety of messaging paradigms. Sometimes referred to as an Enterprise Service Bus (ESB) or an Integration Bus, these products offer publisher-subscriber delivery messaging for the enterprise. They generally provide one or more useful mechanisms like:

Addressing
Connectivity
Account Management
Storage, quotas
Security

However, such solutions are proprietary and require to be deployed by a single entity, often within a single organisation. So these are also not suitable for distributed ledger technology, especially for public blockchains.

As discussed above, the first and second aspects and embodiments of the present disclosure propose providing a channel service to implement messaging functionality via the use of separate, identifiable channels, i.e. communication paths or sessions, provided for peer- to peer communication for many applications. This can be implemented across a number of applications and use cases that require entities exchanging messages, while disassociating the participating entities from having any links or downloading any part of a blockchain. Examples of some of these use cases are explained in the section entitled 'Use Cases' in this document.

As discussed above, individual channels have owners, the owners being the clients that have registered with the channel service, and the client obtains channel functionality in the form of APIs to configure channel read/write permissions. These permissions can for instance be to disallow unauthenticated connections; and provide distinct read/write permissions for channels and also individual message by the issue of revocable assess tokens, i.e. API keys or tokens. As discussed, the channel operates using known transport protocols an application-level end-to-end encryption protocol, which protects transported messages therein.

First Aspect—Implementation of a Channel Service

The Channel processor for providing a channel services as described above for the first aspect may be Platform as a Service (PaaS) and Software as a service (SaaS) offering that advantageously enables end-to-end (peer-to-peer) communication or messaging services for one or more clients.

As mentioned above, requests may be received via or using Internet communication protocols from a client via an access point or API for the channel processor, as the API can be implemented as a web service, although the method is not so limited. For instance, an alias associated with the channel processor can also be used, i.e. based on the bsvalias addressing protocol mentioned above. FIG. 1 relates to the first aspect of the present disclosure and depicts a computer implemented method for providing a channel service for facilitating peer to peer communications for one or more clients. The method of FIG. 1 is implemented by a channel processor, which may include one or more channel processors.

Step 102 relates to a registration request for the channel service from a client. Step 102 depicts receiving the request from a given client among the plurality of clients. As mentioned above, the client can be one with no functionality whatsoever for interacting with a blockchain, or one with limited functionality such an SPV wallet, or can even be a miner node running a full copy of the blockchain. As the channel processor is associated with an API endpoint, identified by a URI or an alias, in this example, the request from the given client may be based on a standard Internet protocol such as a Hypertext Transfer Protocol (HTTP) transmission protocol format. In some embodiments, the request may include an identifier for the client as well as an identifier for the service requested.

Step 104 depicts creating an account for the client, the account associated with account credentials such as a unique client or account identifier and an access key for the channel service, which may be a password or PIN or may even be one or more cryptographic keys associated with the client. In some cases, on registration a record may be created for the given client based on the account credentials.

An example schema associated with account registration may be:

```
Openapi: 3.0.0
...
components:
  securitySchemes:
    basicAuth: # name for scheme
      type: http
      scheme: basic
security
  --basicAuth: [ ]
```

Step 106 depicts providing access to channel as well as message functions to enable the client to implement peer to peer direct communication with any other entity using channels. The channels can be created using the channel functions, and the data flow within the channels can be based on the message functions provided. As discussed above, these can be channel APIs or message APIs. The Channel APIs, secured by account credentials, allow account holders to create and manage channels. The Messaging APIs allow account holders and counterparties, i.e. the other entities or third parties for which the channel is created, or even the other entities such as administrators (if the client is an organisation) to read from, or write to the channels.

Thus, the channel service identifies is customers/users via the account credentials from step 104 and/or the channels for each account, each of which will have a unique identifier. Message streams, whether one-shot or long-lived streams, are logically arranged into channels, which in turn are owned by a single account, the client account. Once set up, the client can identify itself to the channel service via the account credentials.

In some embodiments, the channel and message functions can also include functionality for an account holder (the client) to generate API tokens which may be passed to third parties (message exchange counterparts, with which the client wishes to communicate directly), should the channel owner require authentication for its APIs. Thus the channel APIs can be optionally secured by API tokens.

Figure 1A:
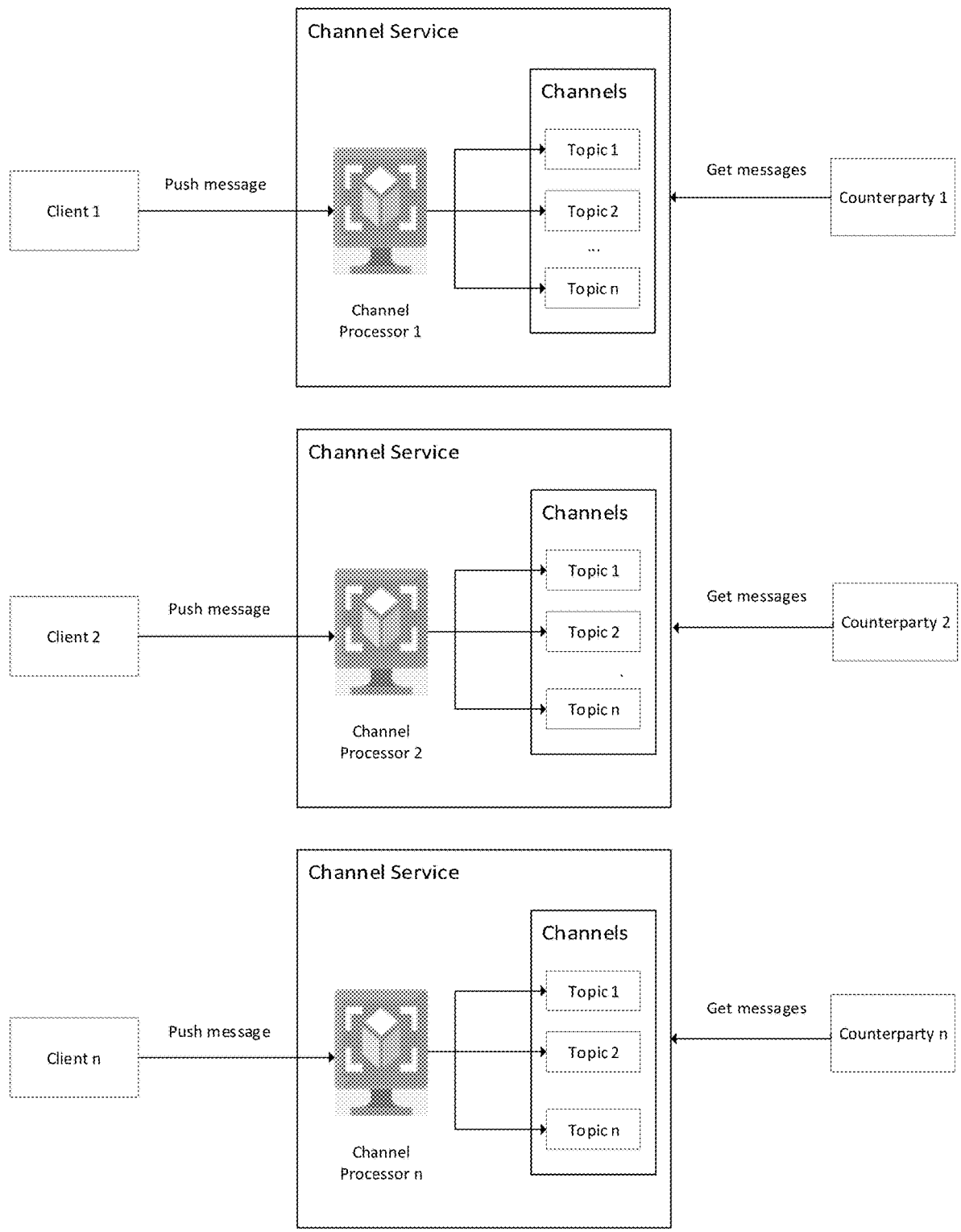
FIG. 1a is a schematic diagram illustrating an example overview of a channel service associated with a blockchain being provided for a plurality of clients, according to the first aspect.

FIG. 1a is a schematic representation of an implementation of a channel service according the first aspect. FIG. 1a shows a channel service provided by a plurality of n, where n>1, number of channel processors implementing the channel service for a plurality of n clients, each client communicating with one or n counterparties, respectively. As shown, each client may have a number of different channels, each for a specific topic, among n topics.

Figure 2:
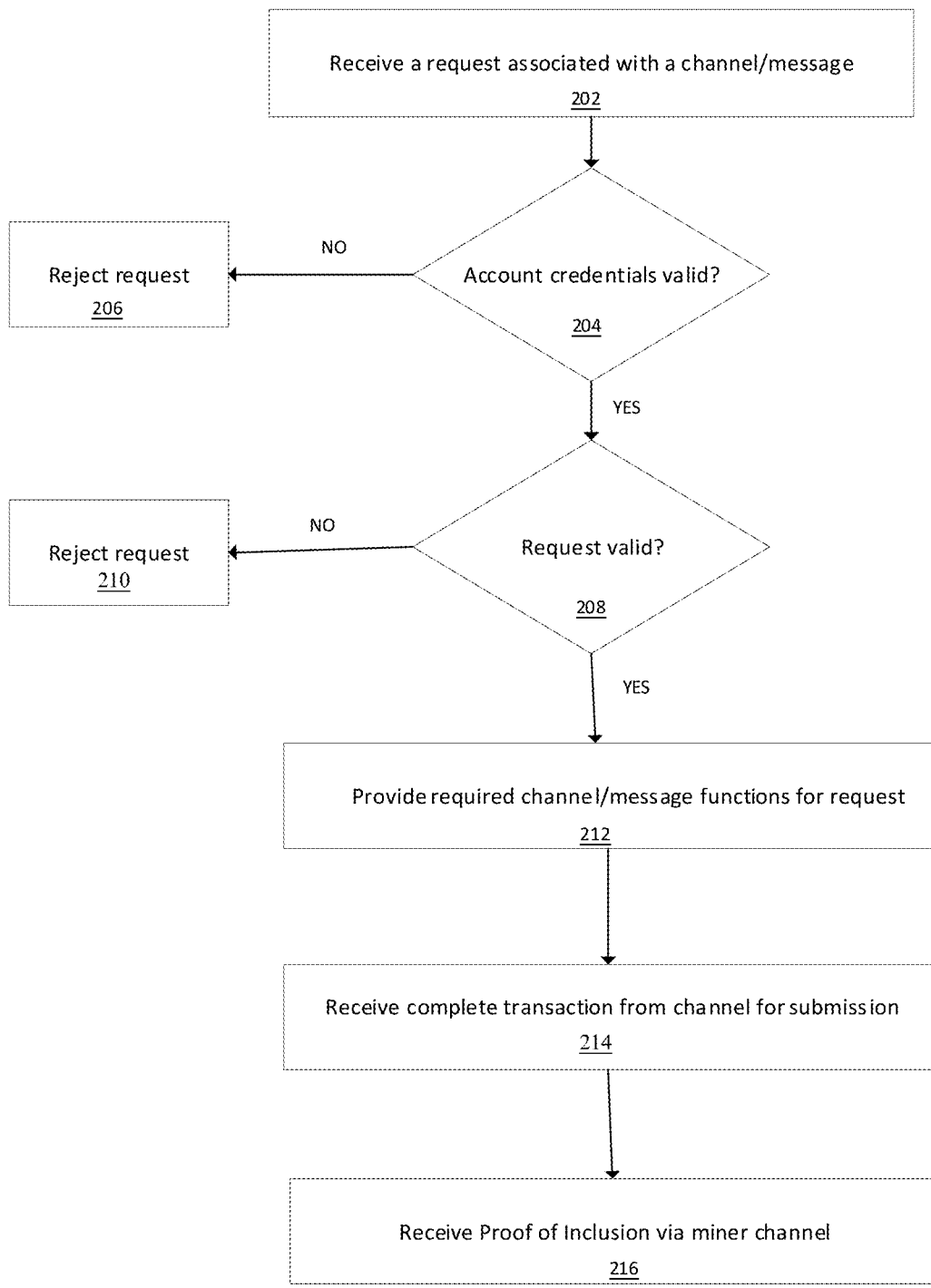
FIG. 2 is a flowchart, depicting a method for implementing a channel service for a given client according to the first aspect, as implemented by a channel processor.

FIG. 2 relates to the first aspect of the present disclosure and depicts a computer implemented method for providing APIs or functions associated with a request relating to specific channel or a message that is associated with a given client account.

Step 202 depicts receiving a request associated with a channel from a given client. This request may be in relation of a channel, i.e. one that is either identified by a unique channel ID or in relation to a new channel for the client account. In some embodiments, this request may be in relation to specific messages, i.e. relating to topic 1 or 2 or n in a specific channel, as seen in FIG. 1a. The request includes the client's account identifier, and may be made following submission of the account credentials in step 104 of FIG. 1.

In step 204 the identity of the client is checked to see if the client is a valid client registered to use the channel service and the functionality offered by it. In some embodiments, this may be based on known authentication methods such as password protected login authentication or the like, during registration. Validation may be based on a password received matching the password in a record. In other embodiments, standard PKI techniques based on cryptographic or addressing private/public key pairs may also be used to validate a digital signature that may be present in the request received form the client in step 202. In this case, the identity of the client can be verified by checking if request signed by the private key can be successfully recovered or validated using the public key.

If the client identity cannot be verified or verification fails, then in step 206 the request is not processed any further.

If the client is validated successfully, then in step 204, the validity of the request for the service in step 208 is checked. This step is to ensure that the given client is indeed authorised to avail the service requested. The permission or attributes for this may be present in the record for the client, to indicate one or more types of access levels or service that can be provided to a respective client. For instance, the client may have permission to create a channel and message, but not to modify the message or delete it. Also, in some examples, the channel identified in the request may be incorrect or may not be associated with the given client and therefore invalid.

If the request is found to be disallowed or invalid for the requesting client, then in step 210 the request is not processed any further. Some examples of error messages that may be returned if an unauthorised request is made is given below:

| | |
|---|---|
| Error code 401 | The account credentials/digital signature was not valid. |
| Error code 402 | The account credentials/digital signature was valid, but the request was not authorized. This is because either the account is disabled, or the account holder is not the owner of the specified Channel. |
| Error code 403 | The Channel, API token, or other resource was not found. |

It is to be understood that the embodiments of validating the client and/or request set out above are not essential for the operation of implementing the channel service of the first aspect, although it is useful. In some cases only the validation in step 202 or step 206 may be performed. In some cases no validation is performed via the channel processor, as this may be conducted by other means (see second aspect as mentioned above and in detail from FIG. 6 onwards.

If the request is found valid in step 208, then in step 212, the requested channel functions and/or message functions along with their access or API tokens, if requested or required as part of the request or permissions, is provided to the client.

Some examples of specific schema and/or formats associated with requests for channel and/or message functions/APIs are shown below, along with example schema for responses provided by the channel processor.

1. Channel APIs:

Channel APIs may be a JSON-over-HTTP API client accounts provided by the channel service to service to create and/or manage channels for peer-to-peer communication.

All API endpoints may require authentication in some embodiments. The specific authentication scheme may be implementation-determined. Common forms include schemes such as OAuth, basic authentication, and bearer token method. As mentioned above, Channel APIs may be optionally be secured by API tokens that are provided or generated by the clients 1. The Channel APIs, secured by account credentials as seen in steps 204 to 208, allow account holders to create and manage Channels. The following APIs may be provided:

1.1 List Channels: Returns a List of all Channels

Request Format:

GET /api/account/<account-id>/channel/list

Authorization: . . .

Response Format:

```
201 OK
Content-type: application/json
Content-length: ...
{
  "Channel": [
    {
      "id": "...",
      "href": "https://example.org/channel/<id>",
      "public_read": true | false,
      "public_write": true | false,
      "locked": true | false,
      "sequenced": true | false,
      "head": <sequence>,
      "retention": {
        "min_age_days": null | <number>,
        "max_age_days": null | <number>,
        "auto_prune": true | false
      },
      "access_tokens": [
        {
          "id": "...",
          "description": "...",
          "can_read": true | false,
          "can_write": true | false
        }
      ]
    }
  ]
}
```

1.2 Create Channel: Creates a New Channel Owned by the Account Holder.
Request Format:
    POST /api/account/<account-id>/channel
    Authorization: . . .
    Content-type: application/json
    Content-length: . . .

```
{
    "public_read": true | false,
    "public_write": true | false,
    "sequenced": true | false,
    "retention": {
        "min_age_days": null | <number>,
        "max_age_days": null | <number>,
        "auto_prune": true | false
    }
}
```

Response Format:
The successfully created response contains an initial access token. Account credentials in step 204 and set up as per FIG. 1 may be used to access the Channel API, but tokens may need to be used to access the Messaging API. This initial access token for this belongs to the account holder, for the purpose of them reading and writing to the Channel.
    201 OK
    Content-type: application/json
    Content-length: . . .

```
{
    "id": "...",
    "href": "https://example.org/channel/<id>",
    "public_read": true | false,
    "public_write": true | false,
    "sequenced": true | false,
    "head": <sequence>,
    "retention": {
        "min_age_days": null | <number>,
        "max_age_days": null | <number>,
        "auto_prune": true | false
    },
    "access_tokens": [
        {
            "id": "...",
            "token": "...",
            "description": "Owner",
            "can_read": true,
            "can_write": true
        }
    ]
}
```

1.3 Delete Channel
Request Format:
    DELETE /api/account/<account-id>/channel/<channel-id>
    Authorization: . . .
Response Format:
    204 No Content 1.4 Amend Channel: Updates Channel Metadata and Permissions.
Request
    POST /api/account/<account-id>/channel/<channel-id>
    Authorization: . . .
    Content-type: application/json
    Content-length: . . .

Response
This request acts like an HTTP PATCH and so fields from the message body may be omitted if no change is required.

```
{
    "public_read": true | false,
    "public_write": true | false,
    "locked": true | false
}
```

1.5 Generate Channel API Token
Request Format:
    POST /api/account/<account-id>/channel/<channel-id>/api-token
    Authorization: . . .
    Content-type: application/json
    Content-length: . . .

```
{
    "description": "...",
    "can_read": true | false,
    "can_write": true | false
}
```

Response Format:
This is the only API call that will return the token value. If it is lost, the token should be deleted and replaced with a new token.
    201 Created
    Content-type: application/json
    Content-length: . . .

```
{
    "id": "...",
    "token": "...",
    "description": "...",
    "can_read": true | false,
    "can_write": true | false
}
```

1.6 Revoke Channel API Token: Creates a New API Token for Third Parties to Use when Accessing this Channel.
Request Format:
    DELETE /api/account/<account-id>/channel/<channel-id>/api-token/<token-id>
    Authorization: . . .
Response Format:
    204 No Content The Messaging APIs allow account holders and the relevant counterparties (the other entity for the channel to read from, or write message for a given channels.

2. The following Message APIs may be provided as a JSON-over-HTTP API for account holders, and their counterparties, to exchange messages.

2.1 Test Channel for New Messages
Request Format:
    HEAD /api/channel/<id>
    Authorization: <api-token>
Response Format:
    201 OK
    ETag: <max-sequence>

2.2 Write Message to Channel
Request Format:
　　POST/api/channel/<id>
　　Authorization: <api-token>
　　Content-type: . . .
　　Content-length: . . .
Responses Format:
a) Accepted
　　The message was written to the Channel.
　　201 Created
b) Sequencing Failure
　　The Channel was created as sequenced, and the API token associated with the request has not marked as read the latest messages in the channel. If it is still appropriate, the client may need to retry the write attempt.
　　409 Conflict
c) Message Too Large
　　In embodiments where end-to-end encryption secures all messages, for instance based on The Noise Protocol, a maximum size of any single message is set 65536 bytes. As there should not be messages larger than this, it may be in some embodiments useful t to limit the maximum size of any message written to a channel. Messages larger than this may be refused by the channel.
　　413 Payload Too Large
d) Storage Quota Exceeded
　　A quota that may be in some embodiments set by the service operator has been exceeded. The client request may be valid, but the storage service is unable to fulfil it at this time.
　　507 Insufficient Storage
2.3 Get Message in Channel
　　Returns all messages from a Channel, optionally filtered to just unread.
Request Format:
　　GET /api/channel/<id>[?unread=true]
　　Authorization: <api-token>
　　The unread query string parameter is optional.
Response Format:
　　201 OK
　　Content-type: application/json
　　Content-length: . . .
　　ETag: <max-sequence>

```
{
  "messages": [
    {
      "sequence": <number>,
      "received": <unix-timestamp>,
      "content_type": "...",
      "payload": "hex/base64"
    }
  ]
}
```

2.4 Mark Message as Read or Unread: Flags a Message as Read or Unread.
Request Format:
　　POST/api/channel/<id>/<sequence>[?older=true]
　　Authorization: <api-token>
　　Content-type: application/json
　　Content-length: . . .
　　{"read": true|false}
　　The optional older parameter allows a client to mark all messages with a sequence lower than or equal to the supplied <sequence> path argument as read in a single call.

Response Format:
　　201 OK
　　In Step 214, in the embodiment of FIG. 2 a completed transaction may then be provided to the channel processor. This may be sent by the client or by the other entity for the channel. In this embodiment, it is intended that the channel processor submits the transaction to the blockchain to be mined. However, as mentioned earlier, the present disclosure is not so limited. It is possible for the client or the other entity to submit the transaction instead.

In the present embodiment, the channel processor (or submitter in other examples) may then prepare a transaction for submission, and then proceed to create a channel on which an inclusion proof (Merkle tree proof) will eventually be received from the miner. This channel is specific to the channel processor and the miner. The channel processor (or submitter) then submits the transaction to a miner for including in a blockchain network, such as the public BSV blockchain. In some embodiments, the channel processor (or submitter) may also receive a submission response from the miner.

In step 216, the channel processer receives a proof of inclusion in a blockchain from a miner via the channel that was created in step 214. Thus, there is no need for either the channel processor, the client or other entity to have to search the blockchain for such transaction, as the inclusion proof has been provided by the miner directly using the channel service.

Figure 3:
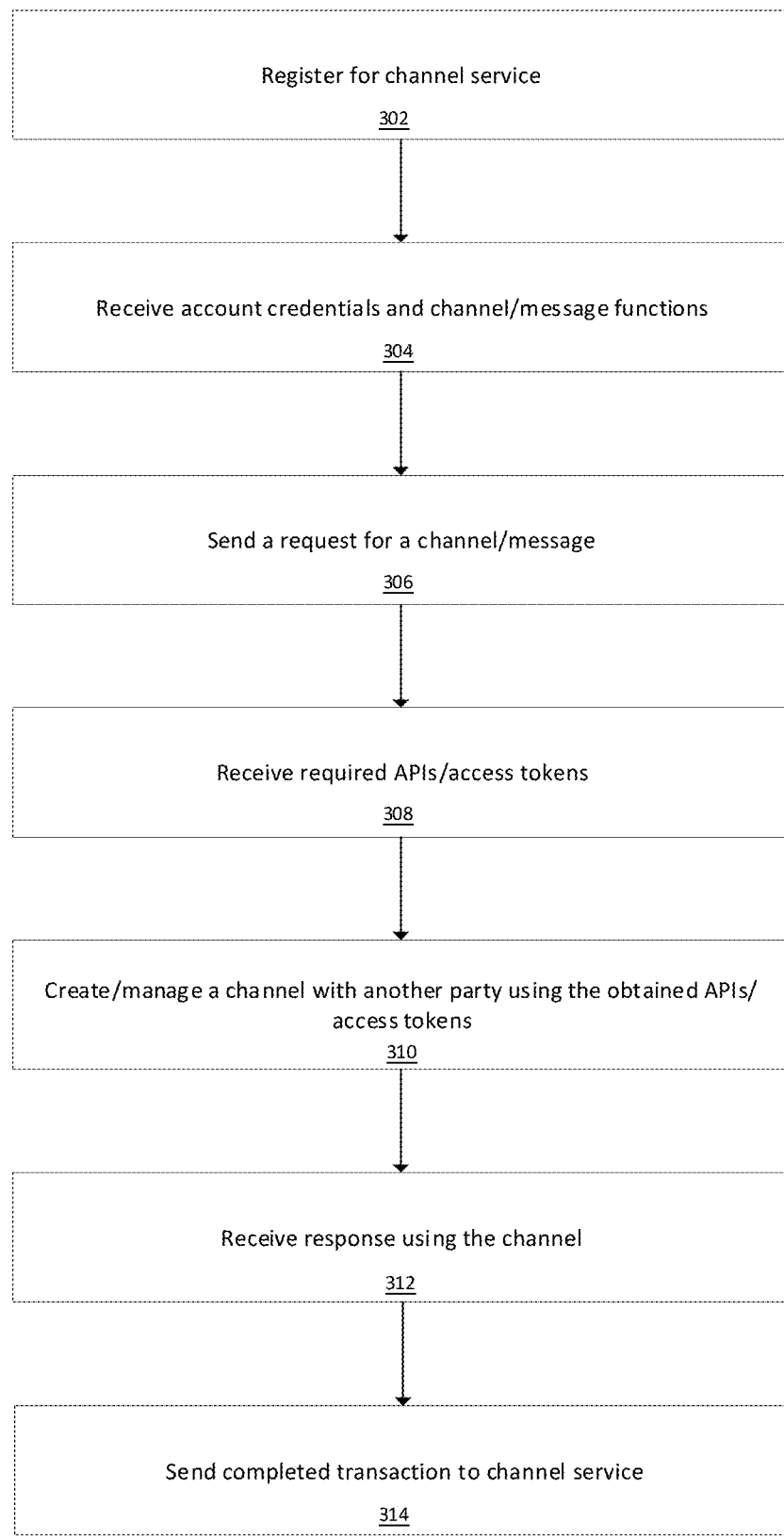
FIG. 3 is a flowchart depicting a method for accessing a channel service, according to the first aspect, as implemented by one or more processors associated with a client.

The method of FIG. 3 relating to the first aspect is implemented by one or more processors associated with a client.

In step 302 the client prepares a request for a channel service and sends it to the channel service (channel processor) and in step 304 receives the required account credentials, that are associated with an account identifier and an access key for the client account. The client identifier in some embodiment includes a client alias or identifier and/or a service identifier in the request. This is similar to steps 102 and 104 of FIG. 1 for this process. The request prepared may be sent by the client sent using a Hypertext Transfer Protocol (HTTP) or similar transmission protocol format. In some embodiments, it is sent to the channel processor that is implemented as a HTTP or REST API, and the responses may also be provided to the client in the HTTP transmission protocol format.

In step 306, a request that relates to a specific channel or a message is sent by the client, similar to step 202 in FIG. 2 when received by the channel processor. In step 308, the response with channel or message APIs as well as access tokens, if needed, for the request is provided to the client. The examples of requests sent as well as the responses received for channel and/or message APIs are seen in step 212 in FIG. 2.

In step 310, the received APIs from the channel processor in step 308 is then used to create a channel with another entity. For instance, the client may be a merchant and the other party may be a customer or a counterparty with which data or asset transfer such as a payment of a digital assets must take place for a particular invoice or purpose or goods. Any known transport protocols may be used for this via the channel, which provides a direct and end to end path for the client and the other entity secured by the APIs and access tokens.

The received APIs are used to then and/or read or write a message or perform any other function associated with the channel, and/or send messages based on one or more access tokens associated with the channel to the other entity. As mentioned above, the access token can be used to authenticate the other entity. In some embodiments, message APIs are also sent to the other entity for communication via the channel.

In step 312 a response from the other entity or counterparty is received via the channel. This is possible as the other party has received all the required message APIs and well as access tokens in the previous step.

In step 314, responsive to completion of the communication exchange, the client sends the completed transaction to the channel processor in the embodiment of FIG. 3, for submission to the blockchain. As discussed in relation to step 214, if the client or the other party is associated with functionality for submitting the transaction, this is also possible. However, the client or other party is not required to have any such functionality for using the channel service for peer to peer communication using channels.

Figure 4:
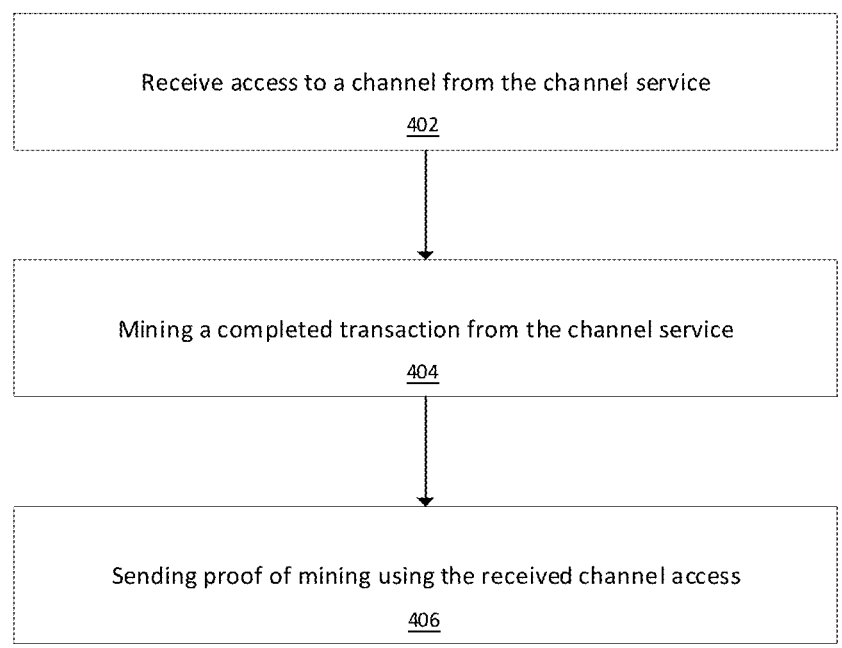
FIG. 4 is a flowchart depicting a method for processing a blockchain transaction using a channel service according to the first aspect, as implemented by one or more processors associated with a miner.

The method of FIG. 4 relating to the first aspect is implemented by one or more processors associated with a miner.

As mentioned above, it is possible for a miner to be a client of the channel service, and in this case, the processes set out in FIGS. 1 to 3 apply to miner nodes as well as client. However, it is not required for a miner node to be a client to be able to still make use of channels that are provided by the channel service. For instance, they can use a channel if one is sent to them where they are the other entity for the channel. This scenario is depicted in FIG. 4.

In step 402, when a completed transaction is provided to the miner by a submitting party for mining (the submitting party may be the channel processor, or a client of the channel service), the submitter can create a channel using the channel service for communication directly with the miner. In this case, as also discussed in step 310 of FIG. 3, the miner receives access to the channel from the submitter and any associated message APIs and access tokens.

In step 404, the miner proceeds to mine the transaction in a block associated with a blockchain using known techniques for mining, some of which is discussed in the background of the present application.

In step 406, the miner then sends a proof of inclusion proof of the transaction in the blockchain directly to the submitter using the channel in step 402, so that there is no requirement for the submitter to have to run a copy of or search the blockchain to find said transaction.

In some embodiments, the proof may be a Merkle tree proof. This is a known authenticated data structure organized as a tree. The hash of each data block is stored in a node on the base layer, or leaf, and every internal node of the tree, or branch, contains a cryptographic hash that is computed from the hashes of its two child nodes. The top node of the tree, the Merkle root, uniquely identifies the dataset from which the tree was constructed. Thus, Merkle trees allow for an efficient proof-of-inclusion, where a miner or a prover node shows to a submitter or a verifier nide that a certain data block is part of the authenticated dataset by sending them a proof with an audit path. The audit path contains the node hashes necessary to recalculate the Merkle root, without requiring the submitter to reveal the whole dataset. In Bitcoin SV, the transactions contained in a block are stored in a Merkle tree.

Second Aspect: Security: Addressing and Encryption

A second aspect of the present disclosure relates to provision of secure addressing and security functions for channels that are used for peer to peer communication. The aspects and embodiments associated with the second aspect can be implemented separately for one or more per to peer channels implemented between entities. In can also be used in combination with the embodiments discussed above the channel service as implemented in accordance with the first aspect. This is the embodiment that is discussed below in relation to FIGS. 5 to 7, but it will be understood that the present disclosure of the second aspect is not limited only to the channel service as described and implemented in the first aspect. The second aspect is concerned with ensuring security for peer-to-peer communication paths for entities. Once example and a relevant use case for the second aspect is its use with the channel service of the first aspect.

Figure 5:
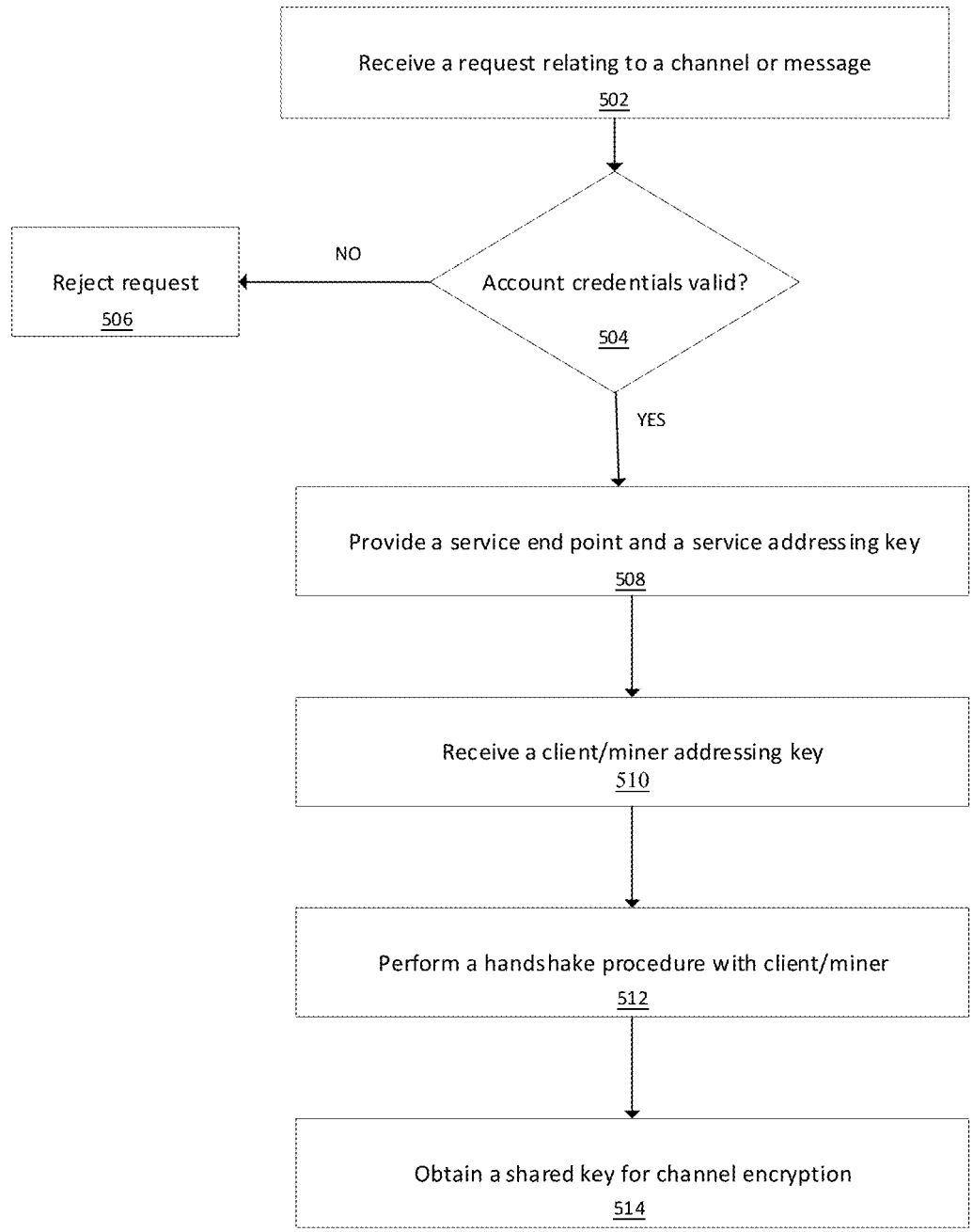
FIG. 5 is a flowchart depicting a method for implementing addressing for a channel service according to a second aspect, as implemented by a channel processor.

The method of FIG. 5 relating to the second aspect is implemented by one or more processors associated with a channel processor that implements a channel service.

Step 502 depicts the steps of receiving a request by a channel processor for a service associated with a channel service from a client. This may also be a miner as mentioned above. The request in this embodiment is for allowing the requesting entity to access a service for facilitating the creation or management one or more channels or messages with a third party or another entity, as discussed in relation to the first aspect.

In step 504, account credentials associated with a requested client is verified, as set out in steps 204 in FIG. 2. This is on the presumption that the requesting client is registered with the channel service as set out in FIG. 1. If the client authentication is invalid, then the request made in step 502 is rejected in step 506 by the channel processor.

In step 508, the channel processor sends a service endpoint for the channel service and at least one service addressing key associated with the channel service.

The service endpoint may be a Hyper Text Transfer Protocol (HTTP) Application programming Interface (API) endpoint, wherein said endpoint is delivered using a HTTP Secure (HTTPS) and is verifiable through a chain of certificates leading back to a known and trusted CA. This is advantageous, as it provides an authentication of the identity of the channel service such that the service endpoint can be trusted as indeed belonging to the channel service, and not a malign party.

In some embodiments the endpoint may be a Universal Resource Location (URL) included in a message from the channel service sent previously, for instance during account set up or channel API or message API delivery for the client This also advantageously ensures that the endpoint can be trusted, as it is provided in messages that can only be associated with the requested channel service. Optionally, a HTTP Authorization header value may also be included. When an asynchronous reply is to be generated by the client (or other party in the channel), a simple HTTP POST call can be used.

The object schema may be extended with the following example properties:

```
{
  "noise_e": "<hex encoded ephemeral public key>",
  "callbackUrl": "https://example.com/api/channel/<id>",
  "authorization": "<type> <credentials>"
}
```

In other embodiments, the service endpoint may be an alias associated with the channel service, such as the bsvalias service as mentioned above where the alias can be verified based on a machine readable JSON resource associated with bsvalias or another addressing service.

In step 510, a client addressing key is obtained from the client. The service addressing key, and/or client addressing key may be one or more static "s" and/or ephemeral "e" keys. This is advantageous as such addressing keys are compatible by one or more known and secure key exchange protocols for end to end encryption, such as the Noise protocol framework.

In step 512, using the addressing key(s), a handshake procedure is followed between the two parties—in this case the channel processor and the client. In some embodiments, the handshake is based on the mechanisms set on in the Noise protocol Framework. Noise is a framework for crypto protocols based on Diffie-Hellman (DH) key agreement. The Noise protocols provide for a well-regarded, reviewed, adopted series of cryptography protocols that solve for all requirements except for initial static key distribution. The Noise Protocol Framework is used to construct schemes that solve for authentication, confidentiality and data integrity by selecting constructs that involve static keys during the handshake phase.

An overview of a Noise compliant handshake is set out below, as set out in http://www.noiseprotocol.org/noise.html:

A Noise protocol begins with two parties exchanging handshake messages. During this handshake phase the parties exchange DH public keys and perform a sequence of DH operations, hashing the DH results into a shared secret key. After the handshake phase each party can use this shared key to send encrypted transport messages.

The Noise framework supports handshakes where each party has a long-term static key pair and/or an ephemeral key pair. A Noise handshake is described by a simple language. This language consists of tokens which are arranged into message patterns. Message patterns are arranged into handshake patterns.

A message pattern is a sequence of tokens that specifies the DH public keys that comprise a handshake message, and the DH operations that are performed when sending or receiving that message. A handshake pattern specifies the sequential exchange of messages that comprise a handshake.

A handshake pattern can be instantiated by DH functions, cipher functions, and hash functions to give a concrete Noise protocol.

The core of Noise is a set of variables maintained by each party during a handshake, and rules for sending and receiving handshake messages by sequentially processing the tokens from a message pattern.

Each party maintains the following variables:
 s, e: The local party's static and ephemeral key pairs (which may be empty).
 rs, re: The remote party's static and ephemeral public keys (which may be empty).
 h: A handshake hash value that hashes all the handshake data that's been sent and received.
 ck: A chaining key that hashes all previous DH outputs. Once the handshake completes, the chaining key will be used to derive the encryption keys for transport messages.
 k, n: An encryption key k (which may be empty) and a counter-based nonce n. Whenever a new DH output causes a new ck to be calculated, a new k is also calculated. The key k and nonce n are used to encrypt static public keys and handshake payloads. Encryption with k uses some authenticated encryption and associated data (AEAD) cipher mode and uses the current h value as associated data which is covered by the AEAD authentication. Encryption of static public keys and payloads provides some confidentiality and key confirmation during the handshake phase.

A handshake message consists of some DH public keys followed by a payload. The payload may contain certificates or other data chosen by the application. To send a handshake message, the sender specifies the payload and sequentially processes each token from a message pattern. The possible tokens are:
 "e": The sender generates a new ephemeral key pair and stores it in the e variable, writes the ephemeral public key as cleartext into the message buffer, and hashes the public key along with the old h to derive a new h.
 "s": The sender writes its static public key from the s variable into the message buffer, encrypting it if k is non-empty, and hashes the output along with the old h to derive a new h.
 "ee", "se", "es", "ss": A DH is performed between the initiator's key pair (whether static or ephemeral is determined by the first letter) and the responder's key pair (whether static or ephemeral is determined by the second letter). The result is hashed along with the old ck to derive a new ck and k, and n is set to zero.

After processing the final token in a handshake message, the sender then writes the payload into the message buffer, encrypting it if k is non-empty, and hashes the output along with the old h to derive a new h.

As a simple example, an unauthenticated DH handshake is described by the handshake pattern:
 →e
 ←e, ee The initiator sends the first message, which is simply an ephemeral public key. The responder sends back its own ephemeral public key. Then a DH is performed, and the output is hashed into a shared secret key.

Note that a cleartext payload is sent in the first message, after the cleartext ephemeral public key, and an encrypted payload is sent in the response message, after the cleartext ephemeral public key. The application may send whatever payloads it wants.

The responder can send its static public key (under encryption) and authenticate itself via a slightly different pattern:
 →e
 ←e, ee, s, es In this case, the final ck and k values are a hash of both DH results. Since the es token indicates a DH between the initiator's ephemeral key and the responder's static key, successful decryption by the initiator of the second message's payload serves to authenticate the responder to the initiator.

Note that the second message's payload may contain a zero-length plaintext, but the payload ciphertext will still contain authentication data (such as an authentication tag or "synthetic IV"), since encryption is with an AEAD mode. The second message's payload can also be used to deliver certificates for the responder's static public key.

The initiator can send its static public key (under encryption), and authenticate itself, using a handshake pattern with one additional message:
 →e
 ←e, ee, s, es
 →s, se The following sections flesh out the details, and add some complications. However, the core of Noise is this simple system of variables, tokens, and processing rules, which allow concise expression of a range of protocols.

In step 514, based on the handshake set out above, a shared secret key is obtained, which is then in turn the key that is used for end-to-end encryption for the channel. In some embodiment, the shared key is not directly used, and there may additionally be other processes and further key derivations, secondary DH exchanges, double-ratchets, etc. that can also be used in combination with any such key that is obtained following the handshake in step 512.

Figure 6:
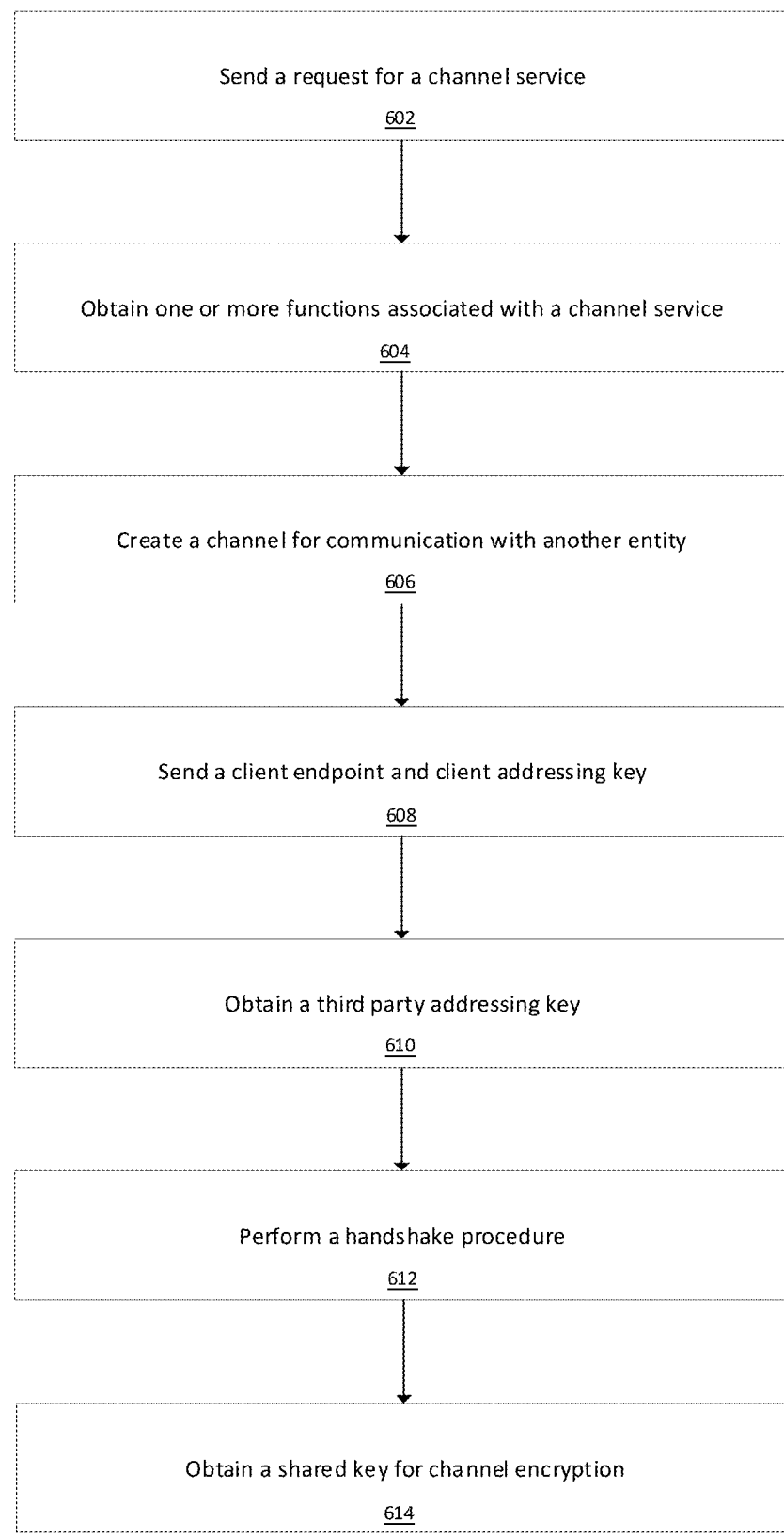
FIG. 6 is a flowchart depicting a method for implementing addressing for a channel using a channel service, according to the second aspect, as implemented by one or more processors associated with a client.

The method of FIG. 6 relating to the second aspect is implemented by one or more processors associated with a client.

In step 602, a request associated with the channel service is sent by the client, and in step 604, following successful validation, one or more functions associated with the channel service are obtained, i.e. channel and message APIs etc. These steps are similar with the steps 306 and 308 in FIG. 3, and are also related to steps 502 and 504 of FIG. 5.

In step 606, the client creates a channel for communication with a counterparty or third party (other entity). This is similar to step 310 of FIG. 3.

In step 608, a client addressing key as well as a client endpoint is sent to the other entity via the created channel. In step 610, a third party addressing key is received from the other entity. These steps are similar to steps 508 and 510, except that instead of the channel processor, it is the client that is providing the endpoint and addressing key to another party via the channel. In some embodiments, the other party may be a miner, the channel processor or some other third party entity with which direct communication via the channel is intended and for which a client endpoint is provided.

Steps 612 and 614, for performing the handshake for identifying a shared secret key for use for end to end encryption is similar to steps 512 and 514, except that the handshake is between the client and another entity.

Figure 7:
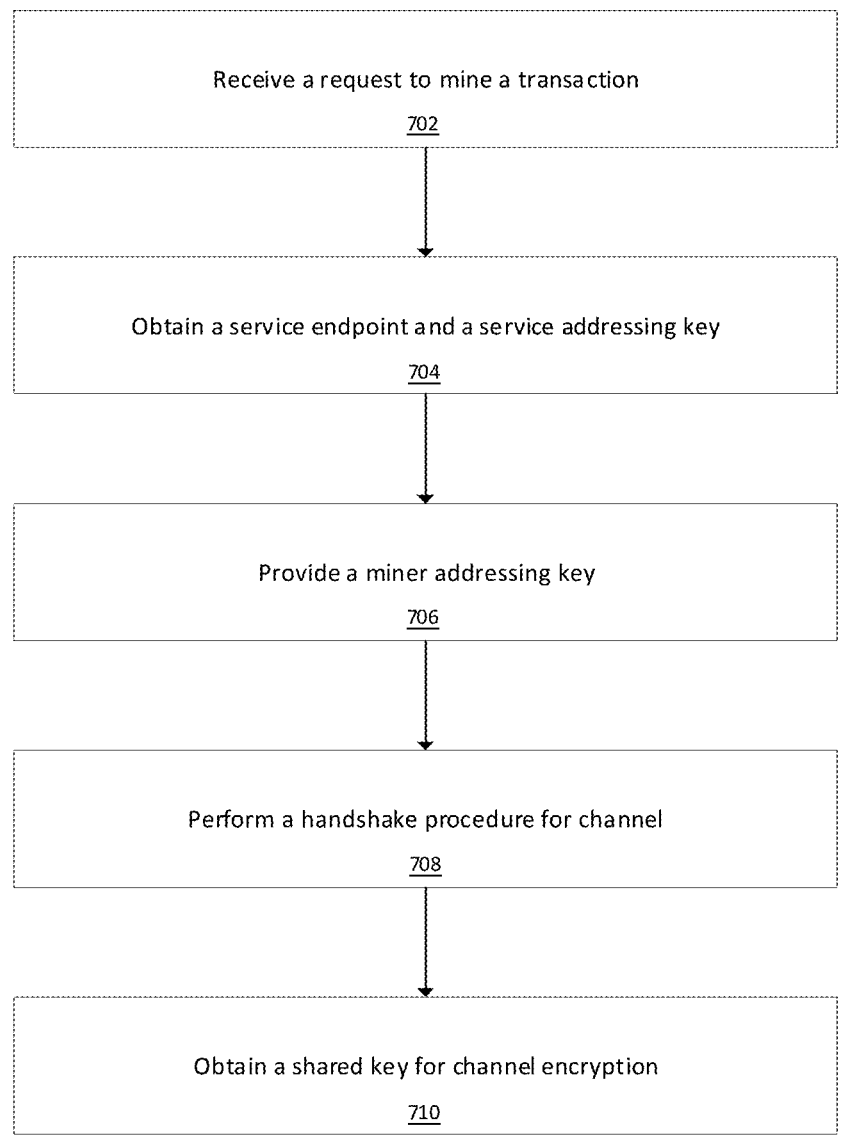
FIG. 7 is a flowchart depicting a method for processing a blockchain transaction using a channel service according to the second aspect, as implemented by one or more processors associated with a miner.

The method of FIG. 7 relating to the second aspect is implemented by one or more processors associated with a miner.

Step 702 depicts a miner receiving a request from a submitter for mining a completed transaction. This request may be from a channel processor or a client that is associated with the channel service implemented by the channel processor. In some embodiments, the miner may also be a client of the channel service. Although in the embodiment of FIG. 7 the channel processor is the submitter, the present disclosure is not so limited.

Step 704 is similar to step 608, where a service (submitter) addressing key and a service (submitter) endpoint is received. Step 706 is similar to step 610, except that in this case a miner addressing key is provided.

Steps 708 and 710, for performing the handshake for identifying a shared secret key for use for end to end encryption is similar to steps 512 and 514, except that the handshake is between the miner and the submitter.

Figure 8:
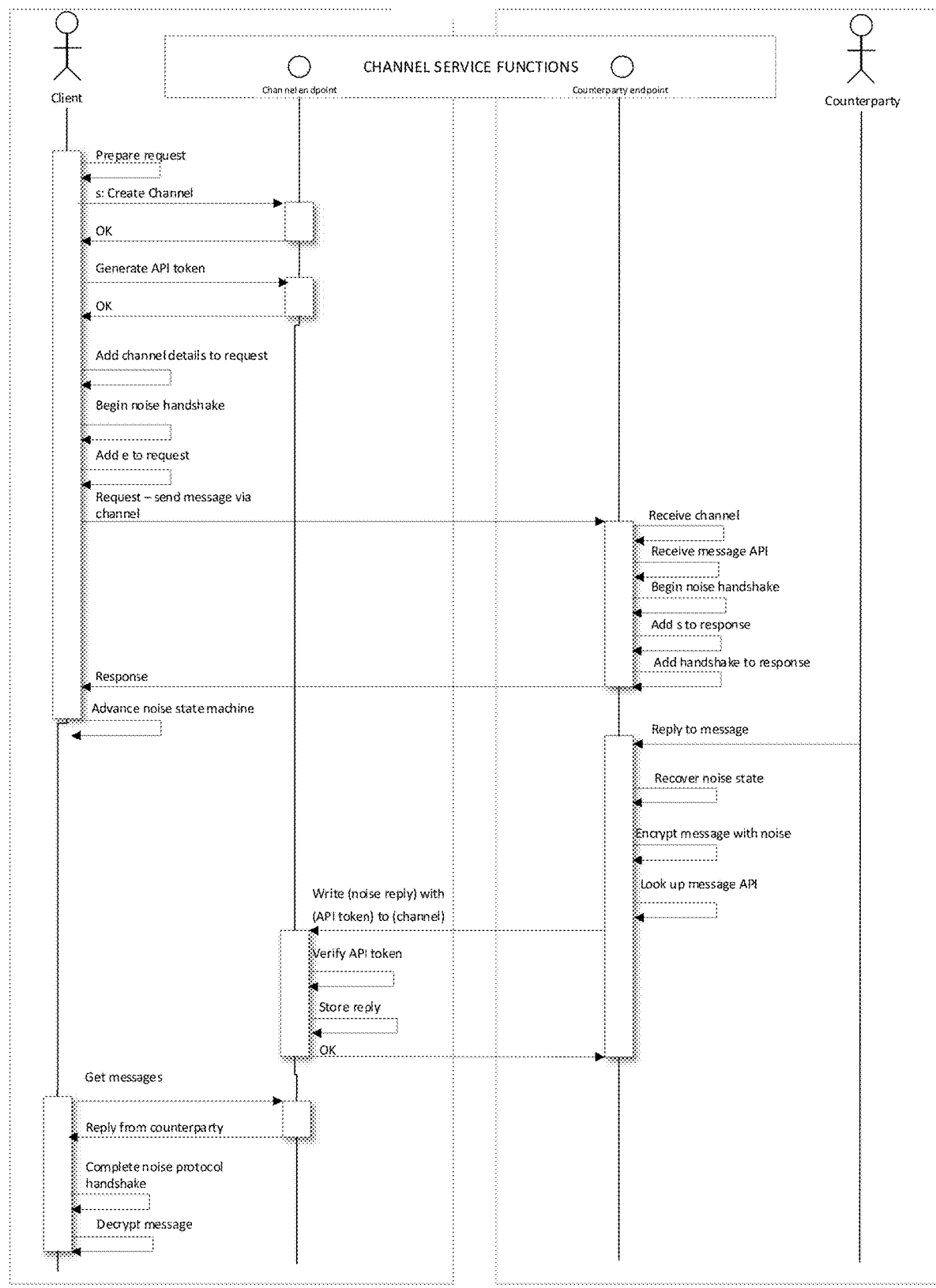
FIG. 8 is a schematic flow diagram illustrating an example of providing addressing and end-to-end encryption for communication via a channel in according with the second aspect.

FIG. 8 represents an example flow of messages using a channel, for an example of a peer to peer communication/transaction/exchange between a client of a channel service and another entity (counterparty) based on methods discussed in relation to the first as well as the second aspects of the present disclosure that have been explained above.

Use Cases

This section describes a number of existing real-world scenarios using party-to-party application messaging system in which aspects and embodiments of the present disclosure can be implemented/used/applied to realise all of the advantages explained above in relation to the first and second aspects.

A) Peer-to-Peer Transactions:

To spread crypto adoption, crypto payments have to get closer to how fiat payments work, and specifically, how we traditionally pay for items at a check-out counter. The customer needs to be able to spend BSV without being online, putting the burden on the merchant to broadcast the transaction. To do this, a low bandwidth SPV system is a suitable solution. Customers will have wallets which can be offline the majority of the time, with only the ability to pay for transactions with contained block headers UTXOs, Input Txs and Merkle paths. Merchants, on the other hand, will have systems which can be branched throughout a location with a central hub, receiving those payments and broadcasting them to the blockchain.

Figure 9:
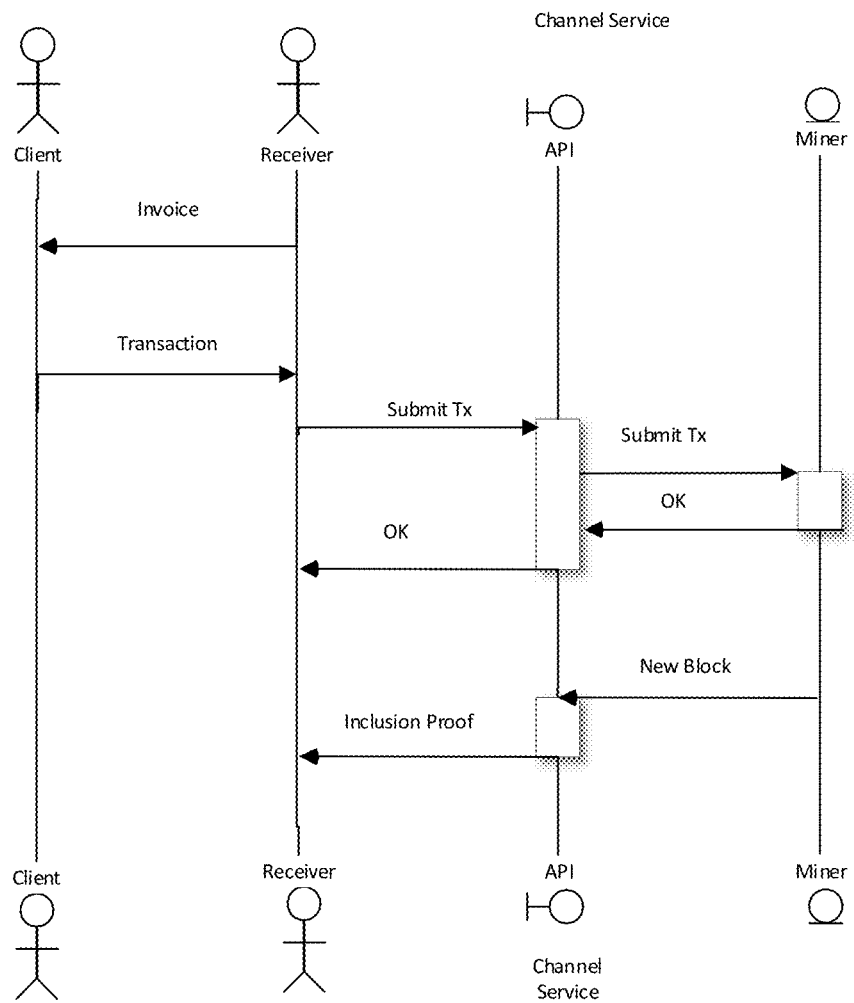
FIG. 9 is a schematic flow diagram illustrating an example use case of the above aspects relating to peer-to-peer asynchronous communications which are associated with a blockchain

A schematic representation of such peer-to-peer flow is seen in FIG. 9. This flow of invoice-transaction-submission-verification allows parties to transact without having to maintain and inspect a full replica of the Bitcoin SV blockchain.

The sender and receiver systems may be sophisticated solutions with advanced key management on the server-side and always-on connectivity, in which case they may communicate directly in response to a user request. However, the sender and/or receiver may be an end-user device with partial connectivity. In this arrangement, the sender and the receiver may not be connected and reachable concurrently. Further, in the case where both the sender and receiver are partially-connected devices, they may both be behind a Network Address Translation (NAT) configuration, which would prevent them from being able to communicate directly even if both were online concurrently.

A solution as provided by the channel service of the present disclosure suitable for the peer-to-peer exchange of transactions advantageously allows peers to exchange messages when the counterparty is offline, and in deployments where there is no straightforward route between the two parties.

B) Invoicing:

Invoicing allows transacting parties to issue requests for payments directly from the recipient to the sender. Logically, an invoice is made up of:
Issuer details
Invoice number or payment request reference
Payment destination(s) script(s)
Amount payable
Return path Implementing the channel service of the present disclosure for the invoicing use case advantageously satisfies the following requirements:
   Addressing: the invoice issuer must be able to address the invoice for delivery to the invoice receiver, and the sender must be able to subsequently deliver a payment transaction to the issuer
   Confidentiality: invoices may be private and/or commercially sensitive, and must not be viewable by any third party outside of the transacting parties
   Authentication: parties must be able to authenticate the counterparty in any message exchange, in order for the sender to verify the legitimacy of the invoice source (the receiver), and for the invoice source not to violate the privacy of the sender by sharing details with another party.
   Data Integrity: messages must be tamper-evident, such that a sending party may know that an invoice received has not been modified since issued by the receiver, for example to modify the payment destination(s), amount payable, or the supposed issuer details C) Payment Channels:

Payment channels are a technique for off-chain payment negotiation that reduce counterparty risk to nearly zero. Typical uses for payment channels are for scenarios where low-value, high-frequency metered billing is required. Some examples of such payment scenarios include:
- Public Wi-Fi access
- Streaming media (movies, sports events)
- Parking
- Pre-pay domestic utilities (electric, gas, water)

One construction of payment channels is similar in nature to credit card pre-authorisations, in which the supplier or merchant can be sure that funds are reserved whilst the customer is still protected against non-delivery of goods or services.

In this construction, an initial funding transaction is constructed that pays the funds fully to the supplier. Before this transaction is submitted for inclusion to the Bitcoin SV blockchain, a refund transaction is constructed that returns all funds back to the customer. This refund transaction is further encumbered by a time lock, set far enough into the future to allow for the provision of goods or services to run to its conclusion.

If neither party takes any further action, the customer can be sure that the "pre-authorised" funds will be returned to them once the time lock expires.

Once service provision begins, a new transaction is constructed that pays out the pre-authorised funds back to both the customer and the supplier, with the ratio of customer: supplier payout being a function of time units passed and per unit price (for example, 1000 satoshis per second). This payout transaction is continually updated by the customer and transmitted to the supplier, in exchange for which the customer receives the next unit of goods or service.

This constantly-updated transaction is also encumbered with a time lock, which is set somewhere between the expected end of service provision and the full customer refund transaction becoming active.

Should either party stop transacting mid-way, the maximum loss to either party is the value of one time-unit of billing, which in this example is the loss of 1000 satoshis for the customer, or the loss of 1000 satoshis worth of goods or services to the merchant. The most recent version of this split payout transaction can be submitted for inclusion in the Bitcoin SV blockchain by either party regardless of the responsiveness of the counterparty.

Should the payment channel run to conclusion, the merchant or service provider will have fully provisioned the goods or service, and the customer will have paid the correct amount. The service provider may submit the final version of the split transaction to settle the payment channel.

This use case represents an almost entirely off-chain solution, with only the "pre-authorisation" transaction and whichever settlement transaction is most appropriate being broadcast to the Bitcoin SV network.

Implementing the channel service of the present disclosure for the payment channel use case advantageously satisfies the following requirements:
- Addressing: the customer and service provider must be able to exchange messages based on some stable destination
- Authentication: although this construction reduces counterparty risk to near-zero, the parties must be able to authenticate each other as penalty clauses may result in action being taken by one party against the other; parties must be sure of who they are communicating with for the lifecycle of the payment channel
- Data Integrity: messages must be verifiably received as they were sent to prevent a third party from "framing" one of the transacting parties for breach of contract or other penalties
- Real Time: payment channels may operate on low value increments with high frequency (although not all will); for scenarios where the time unit is short, it is necessary for updates to the split transaction to be routed in (pseudo) real-time from the customer to the supplier, in order to prevent interruption of service from perceived non-payment D) Multi-Signature Wallets:

Multi-Signature wallets protect funds with scripts that require authorisations, in the form of signatures, from multiple parties within a defined group. Whether traditional (sometimes referred to as "naked") OP_CHECKMULTISIG based or the newer accumulator multisig construction, wallets can be configured to require a subset of the group to provide authorisations, with the size of that subset ranging from 1 to every party. This is sometimes referred to as M-of-N multisig.

Until M signatures are applied to the spend of a multisig-protected fund, the transaction spending it is not valid under Bitcoin rules. This means that unsigned, or partially-signed, transactions cannot be passed between authorising parties via the Bitcoin SV network. In addition, even if this were possible, it would be counter to current scaling initiatives including peer-to-peer transactions and the SPV model.

Figure 10:
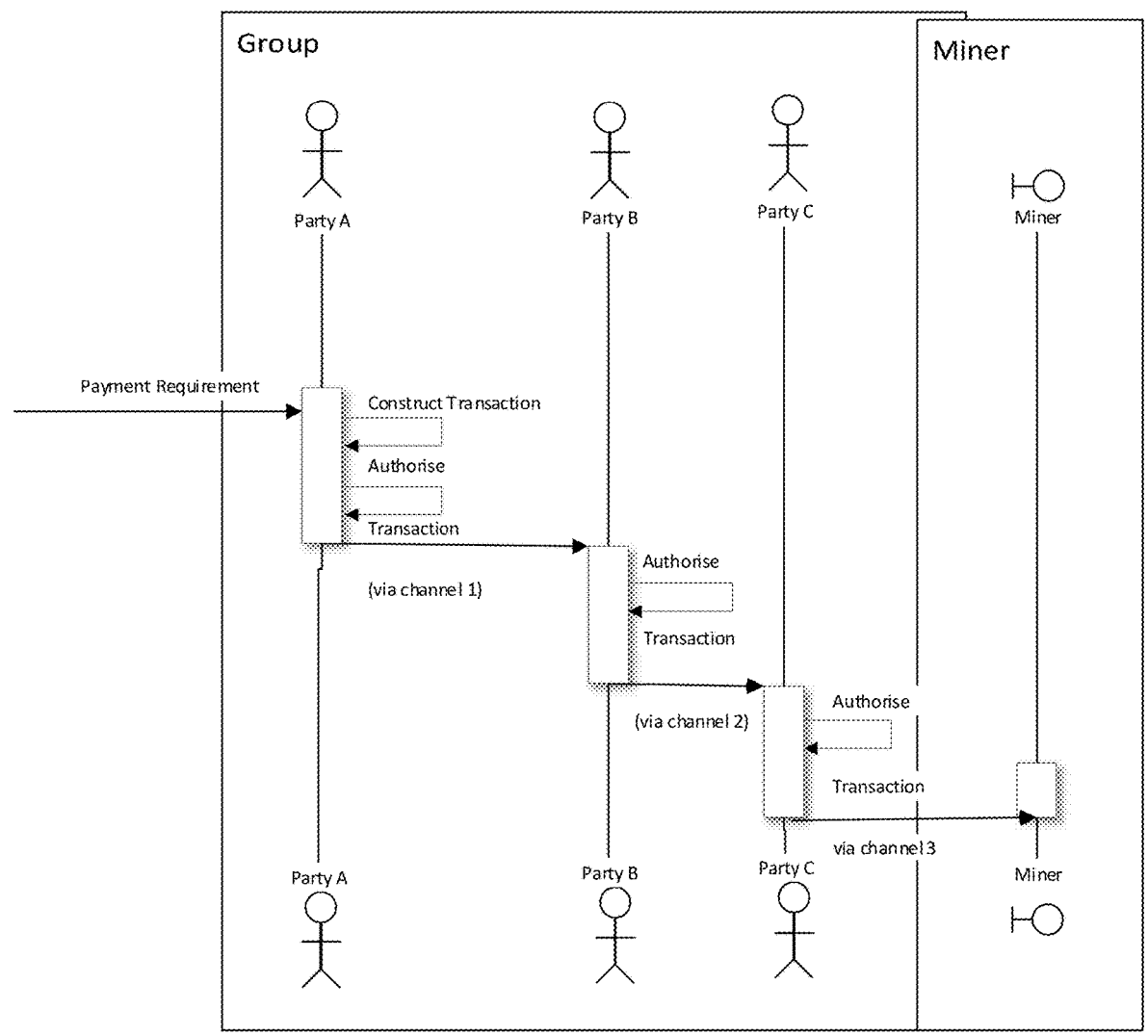
FIG. 10 is a schematic flow diagram illustrating an example use case of the above aspects relating to multi-sig (multiple or threshold number of signatures) authorisations for blockchain transactions.

Parties in a group, therefore, need to be able to pass transactions, together with context (why is this fund being spent, and to whom?), between each other, until sufficient authorisations have been given and the spending transaction becomes valid. It can then be either passed to the fund recipient or submitted for mining. An example schematic flow for this scenario is seen in FIG. 10.

Implementing the channel service of the present disclosure for the multi-signature use case advantageously satisfies the following requirements:
- Addressing: parties must be able to route a transaction (and context) to each other by some handle
- Authentication: parties must be able to authenticate from whom they have received an authorisation request, in order to outright reject fraudulent spend requests
- Data Integrity: the context and the transaction must be as presented to the group by the initiating party Additionally, parties in a group may be using any mix of partially-connected and fully-connected local client software, and that local client software may be unreachable due to NAT deployments. Any messaging solution must be able to overcome these obstacles.

E) Secure Multi-Party Computation:

Secure multi-party computation (also known as secure computation, multi-party computation (MPC), or privacy-preserving computation) is a subfield of cryptography with the goal of creating methods for parties to jointly compute a function over their inputs while keeping those inputs private. Unlike traditional cryptographic tasks, where cryptography assures security and integrity of communication or storage and the adversary is outside the system of participants (an eavesdropper on the sender and receiver), the cryptography in this model protects participants' privacy from each other.

Solutions are beginning to appear that enhance the security of private key-based systems by calculating the private key as part of a multi-party computation. The completion of this protocol, sometimes referred to as dealerless secret distribution, results in a number of parties, devices or systems holding shares of a private key. A second protocol, threshold signatures, further allows those parties holding key shares to collaborate to produce a valid ECDSA signature over a message.

From initiation to signature completion, the private key is never materialised in a single place. This offers a similar level of security to multi-signature schemes, but offers enhanced privacy by hiding the number of parties (and versus some multi-signature schemes, the public keys of those parties) from the blockchain.

Implementing the channel service of the present disclosure for the secure multi-party computation use case advantageously satisfies the following requirements:

Confidentiality: the security of the MPC is broken if any message between any pair of parties is observed by any other party, even those within the same group Authentication: parties must be able to authenticate the counterparty in any message exchange, to prevent breach of confidentiality through man-in-the-middle attacks or similar Data Integrity: messages must be tamper-evident, such that a party may know that a received message has not been altered during transport from the conversation counterparty Depending on the specific application, secret material, including private key shares and other intermediate states, may reside on end-user devices with partial connectivity. Messages between party pairs must be delivered regardless of the connected state of the sender and receiver.

F) Device Synchronisation:

Consider a system model in which the following entities are defined:

Account, which logically holds secrets and/or funds

User, which represents an individual, with permissions to act on behalf of an account, where an account has one or many users Device, which is owned by a user, who may have multiple devices In such a system, many authentication and authorisation schemes are possible. In one model, all account secrets, such as private keys or symmetric keys, are system-managed.

Users authenticate against such a system using one or more well-understood schemes, such as passwords, TOTP/authenticator apps, smart cards, and/or hardware keys. Once authenticated, users may enroll one or more devices under their control, such as desktop or laptop computers, tablets, or smartphones. Increasingly commonly, end-user devices feature secure enclaves, which protect against the loss of secrets (such as private keys) with tamper-resistant hardware. Secure enclave operations may further be protected by additional factors such as biometrics.

Once enrolled, devices typically identify themselves to the system through challenge-response protocols and digital signatures, with device-local keys generated in, and never exported from, device-local secure enclaves. In this regard, these keys act in a similar fashion to client certificates in schemes such as SSL an TLS.

A user may authorise an action within the system to be taken by authenticating locally against their device and issuing the action to the system, with the system recognising the device as enrolled. The system may then enact the action using system-managed secrets, private keys (or shares thereof), and against system-managed funds.

In another model, secrets such as private keys are not managed by the system, but are instead managed by the user's devices.

For services or applications that deploy end-to-end encryption, there is typically a handshake phase, which often involves a key exchange protocol followed by a symmetric key derivation process. The key exchange protocol may be enacted using keys from just one device (especially ephemeral keys), and further those keys may be managed entirely within the secure enclave. At the end of the handshake protocol, only one of the user's devices has knowledge of the symmetric key.

Synchronising cleartext of account or user-level messages received over an end-to-end encrypted channel can be solved for in one of two ways. In both cases, devices must have undergone a similar handshake protocol to establish an end-to-end encrypted channel between them, in pairs, forming a mesh of device-to-device channels.

Once the device mesh is established, either the device that has successfully completed the original third-party handshake shares the resulting symmetric key with the user's other devices, or the device decrypts channel messages then re-encrypts them before forwarding them on to the other devices. Both models are seen in products and services today.

Implementing the channel service of the present disclosure for the device synchronisation use case advantageously satisfies the following requirements:

Addressing: device pairs must be able to locate each other

Figure 11:
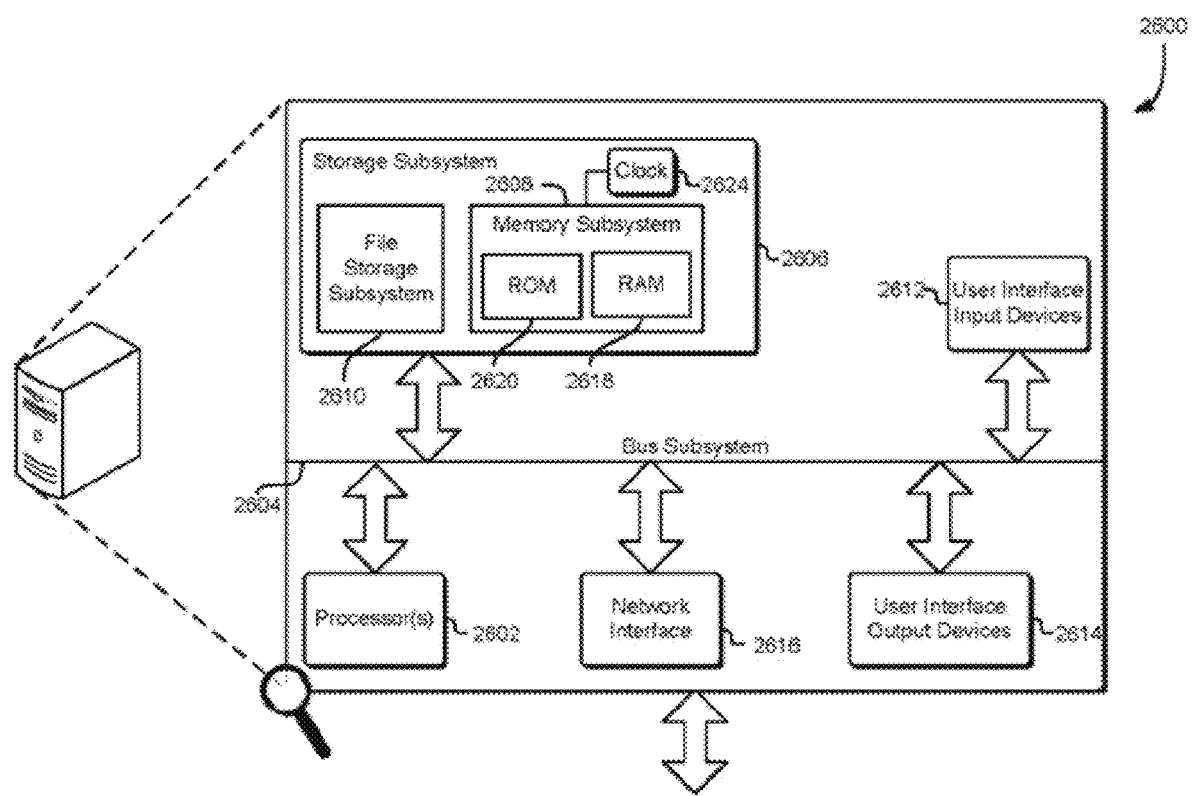
FIG. 11 is a schematic diagram, illustrating a computing environment in which various aspects and embodiments of the present disclosure can be implemented.

Authentication: device pairs must be certain that the counterparty in any message exchange is the expected channel counterparty Confidentiality: no party outside of a device pair may learn the secrets or private messages exchanged between devices Data Integrity: any attempt to interfere with the distribution of messages between devices must not result in devices synchronising erroneous material Synchronisation: devices must not attempt to simultaneously reply to external handshake processes, otherwise (well-constructed) handshakes would fail upon detecting conflicting protocol messages Turning now to FIG. 11, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 11. Thus, computing device 2600 may be a portable computing device, a personal computer, or any electronic computing device. As shown in FIG. 11, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 11 is intended only as a specific example for purposes of illustrating the preferred embodiment of the device. Many other configurations having more or fewer components than the system depicted in FIG. 11 are possible.

The invention claimed is:

1. A computer implemented method for implementing a channel service for messages or transactions associated with a blockchain, the channel service being provided for one or more clients, the method implemented by a channel processor and comprising the steps of:
receiving a registration request from a given client among the one or more clients, the registration request pertaining to the channel service;
creating an account for the given client, said account having an account identifier specific to the given client, and an access key specific to the account identifier;
providing the given client access to one or more functions that enable direct communication between the given client and another entity;
said one or more functions including:
channel functions or procedures pertaining to one or more channels for transmission of data; and/or
message functions or procedures pertaining to the data being transmitted using the one or more channels;
receiving a blockchain transaction associated with the channel from the given client; and
submitting the transaction to the blockchain;
wherein, the step of submitting the transaction to the blockchain comprises:
submitting the transactions to a given miner;
creating a channel for communication with the given miner;
providing the given miner access to one or more functions that enable direct communication with the channel processor; and
receiving from the given miner using the channel, a proof of inclusion of a completed transaction in a block of the blockchain.

2. The method of claim 1, wherein a given channel is associated with a channel identifier, the given channel being configured for communication with another entity in relation to data that is associated with a specific type or topic and optionally where data associated with the given channel is or is included in one or more messages or transactions.

3. The method of claim 1, wherein the given client is an owner of the one or more channels, the method further comprising the step of issuing one or more access tokens for a given channel among the one or more channels, said one or more access tokens being configured for secure communication with another entity, said one or more access tokens pertaining to the given channel or a given message in the given channel.

4. The method of claim 3, wherein the one or more functions are application programming interfaces (APIs) issued for or provide to the given client, said APIs including channel API's for the one or more channels; and message APIs for data associated with each or a given channel; and wherein the access tokens are API tokens that are specific to a given channel or a given message.

5. The method of claim 1, further comprising the steps of:
receiving a request from the given client, the request associated with a channel;
based on a determination that the account identifier and access key pertaining to the given client are valid; allowing the given client access to the account;
based on a determination that the request is valid, processing the request for the channel; and
sending a response to the given client, the response including access to one or more channel functions relating to the request;
wherein the request received includes one or more of:
 a request for listing the one or more channels pertaining to the account for the given client;
 a request for creating a channel for the account;
 a request for deleting an identified channel;
 a request for amending properties and/or permissions associated with an identified channel;
 a request for generate a channel access token for an identified channel;
 a request revoke a channel access token for an identified channel and optionally wherein the one or more channel functions in the response includes a JavaScript Object Notation (JSON)-over-Hyper Text transfer protocol (HTTP) API for the account, to enable creation and/or management of one or more channels.

6. The method of claim 1, further comprising the steps of:
receiving a request from the given client, the request associated with a message, the message pertaining to data associated with a given channel for the given client;
based on a determination that the account identifier and access key pertaining to the given client are valid; allowing the given client access to the account;
based on a determination that the request is valid, processing the request for the message; and
sending a response to the given client, the response including access to one or more message functions relating to the request;
wherein the request received includes one or more of:
 a request for testing for new messages in the given channel;
 a request for retrieving a message in the given channel;
 a request marking or identifying read or unread messages in the given channel;
 a request for writing a message in the given channel and optionally wherein the message functions in the response include a JSON-over-HTTP API for the account, to enable the given client and one or more other entities to exchange messages, and/or read data from, and/or write data to the given channel.

7. The method of claim 1, wherein the channel processor is associated with a HTTP API endpoint, and wherein the request from the given client is received based on a HTTP transmission protocol format and optionally wherein the received request is a HTTP GET or POST or PUT or PATCH request that includes or is associated with an account identifier for the given client.

8. The method of claim 7, wherein the channel processor is associated with an API converter, the API converter is configured for performing the steps of:
receiving the request from the given client in a HTTP transmission protocol format;
converting a received request to a Remote procedure Call (RPC) format, and sending the RPC request to the channel processor to implement the received request;
receiving a response from the channel processor in an RPC format; and
converting the respective response to be sent to the given client using a HTTP transmission protocol.

9. The method of claim 1, wherein the account identifier is an alias that is provided for a given client, the alias being specific to the given client and provided by an alias-based addressing service, the addressing service having a machine readable resource that is accessible from a defined or well-known location, the machine readable resource including one or more capabilities pertaining to the given client and optionally wherein the alias is associated with a domain name for the given client.

10. The method of claim 1, further comprising the step set of providing a channel service library for the given client, said channel service library including one or more modules for facilitating the channel function and/or the message function for the account associated with the given client.

11. A computer implemented method for accessing a channel service for messages or transactions, the channel service being provided for one or more clients, the method implemented by one or more processors of a given client among the one or more clients, the method comprising the steps of:
sending a request pertaining to the channel service, the channel service implemented by a channel processor;
obtaining account credentials for an account created for the given client, said account credentials including an account identifier, and an access key specific to the account identifier;
obtaining access to one or more functions that enable direct communication between the given client and another entity, said one or more functions including:
channel functions or procedures pertaining to one or more channels for transmission of data; and/or
message functions or procedures pertaining to the data being transmitted using the one or more channels;
receiving a blockchain transaction associated with the channel from the given client; and
submitting the transaction to the blockchain;
wherein, the step of submitting the transaction to the blockchain comprises:
submitting the transactions to a given miner;
creating a channel for communication with the given miner;
providing the given miner access to one or more functions that enable direct communication with the channel processor; and
receiving from the given miner using the channel, a proof of inclusion of a completed transaction in a block of the blockchain.

12. The method of claim 11, further comprising the steps of:
sending a request pertaining to a channel for the given client's account;

obtaining a response from the channel processor, the response including access to one or more channel functions relating to the request;
wherein the request includes one or more of:
a request for listing the one or more channels pertaining to the account for the given client;
a request for creating a channel for the account;
a request for deleting an identified channel;
a request for amending properties and/or permissions associated with an identified channel;
a request for generate a channel access token for an identified channel;
a request revoke a channel access token for an identified channel.

13. The method of claim 12, wherein the one or more channel function obtained in the response includes a channel API for the account, said channel API enabling creation and/or management of one or more channels and optionally wherein the response includes access tokens, such as API tokens for each channel function.

14. The method of claim 11, further comprising the steps of:
sending a request associated with a message, the message pertaining to data associated with a given channel for the given client's account;
obtaining a response from the channel processor, the response including access to one or more message functions relating to the request;
wherein the request includes one or more of
a request for testing for new messages in the given channel;
a request for retrieving a message in the given channel;
a request marking or identifying read or unread messages in the given channel;
a request for writing a message in the given channel.

15. The method of claim 14, wherein the one or more message function in the response include a message API for the account, to enable the given client and one or more other entities to exchange messages, and/or read data from, and/or write data to the given channel and optionally wherein the response includes access tokens, such as message API tokens for each message function.

16. The method of claim 11, further comprising:
identifying another entity with which to conduct a communication exchange;
using one or more channel functions received from the channel processor, creating a channel for communication;
sending one or more access tokens associated with the channel to the other entity;
using one or more message functions for the channel received form the channel processor, writing at least one message pertaining to a transaction to the channel;
sending one or more access tokens associated with the one or more messages to the other entity;
receiving at least one reply message pertaining to the transaction in the channel;
responsive to completion of the communication exchange;
providing a completed transaction for submission.

17. The method of claim 11, further comprising the step of receiving and/or storing a channel service library, said channel service library including one or more modules for facilitating the one or more channel function and/or the one or more message function received from the channel processor for the account associated with the given client.

18. A computing device comprising a processor and memory, the memory including executable instructions that, as a result of execution by the processor, causes the device to perform a method for implementing a channel service for messages or transactions, the channel service being provided for one or more clients, the method comprising:
receiving a request from a given client among the one or more client, the request pertaining to the channel service;
creating an account for the given client, said account having an account identifier specific to the given client, and an access key specific to the account identifier;
providing the given client access to one or more functions that enable direct communication between the given client and another entity;
wherein said one or more functions include:
channel functions or procedures pertaining to one or more channels for transmission of data; and/or
message functions or procedures pertaining to the data being transmitted using the one or more channels;
receiving a blockchain transaction associated with the channel from the given client; and
submitting the transaction to the blockchain;
wherein, the step of submitting the transaction to the blockchain comprises:
submitting the transactions to a given miner;
creating a channel for communication with the given miner;
providing the given miner access to one or more functions that enable direct communication with the channel processor; and
receiving from the given miner using the channel, a proof of inclusion of a completed transaction in a block of the blockchain.

19. A non-transitory computer-readable storage medium having stored thereon executable instructions that, as a result of being executed by a processor of a computer, cause the computer to perform a method for implementing a channel service for messages or transactions associated with a blockchain, the channel service being provided for one or more clients, the method comprising:
receiving a registration request from a given client among the one or more clients, the registration request pertaining to the channel service;
creating an account for the given client, said account having an account identifier specific to the given client, and an access key specific to the account identifier;
providing the given client access to one or more functions that enable direct communication between the given client and another entity;
said one or more functions include:
channel functions or procedures pertaining to one or more channels for transmission of data; and/or
message functions or procedures pertaining to the data being transmitted using the one or more channels;
receiving a blockchain transaction associated with the channel from the given client; and
submitting the transaction to the blockchain;
wherein, the step of submitting the transaction to the blockchain comprises:
submitting the transactions to a given miner;
creating a channel for communication with the given miner;
providing the given miner access to one or more functions that enable direct communication with the channel processor; and receiving from the given miner using the channel, a proof of inclusion of a completed transaction in a block of the blockchain.

\* \* \* \* \*